United States Patent
Ohi

(10) Patent No.: US 6,529,943 B1
(45) Date of Patent: Mar. 4, 2003

(54) SERVER, CLIENT, CLIENT SERVER SYSTEM, METHOD FOR CONTROLLING THEM AND STORAGE MEDIUM THEREFOR

(75) Inventor: Hirokazu Ohi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/296,302

(22) Filed: Apr. 22, 1999

(30) Foreign Application Priority Data

Apr. 24, 1998 (JP) .......................................... 10-129673

(51) Int. Cl.⁷ .............................................. G06F 15/16
(52) U.S. Cl. ......................... 709/206; 709/328; 709/203
(58) Field of Search ................................ 709/203, 206, 709/223, 224, 245, 328, 329

(56) References Cited

U.S. PATENT DOCUMENTS

| | | | | |
|---|---|---|---|---|
| 5,144,555 A | * | 9/1992 | Takadachi et al. ........... | 707/517 |
| 5,557,659 A | * | 9/1996 | Hyde-Thomson ........ | 379/88.11 |
| 5,572,648 A | * | 11/1996 | Bibayan ...................... | 345/825 |
| 5,602,916 A | * | 2/1997 | Grube et al. .................. | 380/21 |
| 5,632,011 A | * | 5/1997 | Landfield et al. ........... | 709/206 |
| 5,706,502 A | * | 1/1998 | Foley et al. ................. | 709/203 |
| 5,752,159 A | * | 5/1998 | Faust et al. .................. | 709/219 |
| 5,835,087 A | * | 11/1998 | Herz et al. ................... | 345/810 |
| 5,855,020 A | * | 12/1998 | Kirsch .......................... | 707/10 |
| 5,864,684 A | * | 1/1999 | Nielsen ....................... | 709/206 |
| 5,870,546 A | * | 2/1999 | Kirsch .......................... | 709/205 |
| 5,937,041 A | * | 8/1999 | Cardillo et al. ........... | 379/93.25 |
| 5,963,915 A | * | 10/1999 | Kirsch .......................... | 705/26 |
| 6,014,688 A | * | 1/2000 | Venkatraman et al. ......... | 707/8 |
| 6,035,298 A | * | 3/2000 | McKearney ................. | 707/10 |
| 6,049,831 A | * | 4/2000 | Gardell et al. .............. | 709/236 |
| 6,073,165 A | * | 6/2000 | Narasimhan et al. ....... | 709/206 |
| 6,073,174 A | * | 6/2000 | Montgomerie et al. ..... | 709/224 |
| 6,167,523 A | * | 12/2000 | Strong .......................... | 705/37 |
| 6,182,146 B1 | * | 1/2001 | Graham-Cumming, Jr. . | 709/238 |
| 6,188,995 B1 | * | 2/2001 | Garst et al. .................. | 345/853 |
| 6,195,694 B1 | * | 2/2001 | Chen et al. .................. | 713/200 |
| 6,216,122 B1 | * | 4/2001 | Elson ............................. | 707/3 |
| 6,230,156 B1 | * | 5/2001 | Hussey ........................ | 707/10 |
| 6,253,202 B1 | * | 6/2001 | Gilmour ...................... | 709/203 |
| 6,259,449 B1 | * | 7/2001 | Saxena et al. ............... | 709/202 |
| 6,269,399 B1 | * | 7/2001 | Dyson et al. ................ | 709/224 |
| 6,298,444 B1 | * | 10/2001 | Foss et al. ................... | 358/400 |
| 6,343,311 B1 | * | 1/2002 | Nishida et al. ............. | 709/201 |
| 6,366,698 B1 | * | 4/2002 | Yamakita ..................... | 345/619 |
| 6,370,566 B2 | * | 4/2002 | Discolo et al. ............. | 709/221 |
| 6,418,466 B1 | * | 7/2002 | Bertram et al. ............. | 345/744 |

OTHER PUBLICATIONS

Nagasaka et al., "Data Acquisition and Event Filtering by Using Transputers", 1992, IEEE, pp. 841–844.*

Schutz, "On the Testability of Distributed Real–Time systems", 1991, IEEE, pp. 52–61.*

(List continued on next page.)

*Primary Examiner*—Bunjab Jaroenchonwanit
(74) *Attorney, Agent, or Firm*—Fitzpatrick, Cella, Harper & Scinto

(57) ABSTRACT

Part of the functionality and information of a server is published to a client, and the client makes a request based on this information, and before embedding the request from the client into processing, a server determines whether the request is invalid. In addition, before the processing is executed into which the request from the client has been embedded, whether the request is invalid is determined again.

This configuration enables a detailed request from the client to be safely embedded into the server's processing and also enables the server and system to be stably operated.

38 Claims, 17 Drawing Sheets

OTHER PUBLICATIONS

Schill, "Controlling Dynamic Object Transfer Between Distributed Repositories", 1992, IEEE, pp. 0164–0171.*

Radiya, "Expressing intratask parallelism in discrete event simulation models", 1994, IEEE, pp. 24–29.*

Mansouri et al., "A Configurable Event Service for Distributed Systems", 1996, IEEE, pp. 210–217.*

Nomoto et al., "Augmented Trigger Mechanisms for Groupwork Environment", Dept. of Information Science, Kyoto University 6 pages.*

Koschel et al., "Configurable Event Triggered Services for CORBA–based Systems", 1998, IEEE, pp. 306–318.*

Malone et al., "Experiments with Oval: Aradically Tailorable Tool for Cooperative Work", 1992, ACM, pp. 289–297.*

Poledna et al., "Reliability of Event–Triggered Task Activation for Hard Real–Time Systems", 1993, IEEE, pp. 206–210.*

Abowd et al., "Integrating status and event phenomena in formal specifications of interactive systems", 1994, Sigsoft, pp. 44–52.*

Sarin et al., "A Process Model and System for Supporting Collaborative Work", 1991, ACM, pp. 213–224.*

Hayton et al., "Using Events to Build Large Scale Distributed Applications", 1996, ACM, pp. 9–16.*

Taha et al., "Simulation of Continuous Mail Processing", 1987, Winter simulation Conference, pp. 894–899.*

Jablonski et al., "Concepts and Methods for The Optimization of Distributed Data Processing", 1990, IEEE, pp. 171–180.*

* cited by examiner

FIG. 2

| | ON MAIL SENDING | | TIME OUT | |
|---|---|---|---|---|
| | INFORMATION | FUNCTION | INFORMATION | FUNCTION |
| | · SENDER MAIL ADDRESS<br>· DESTINATION MAIL ADDRESS<br>· CC MAIL ADDRESS<br>· SUBMISSION DATE AND TIME<br>· SUBJECT<br>· BODY LENGTH<br>· BODY<br>· ATTACHED FILE | · SEND ACCEPTANCE<br>· SEND REJECTION<br>· SAVE AS FILE<br>· TEMPORARY SAVE<br>· PRINT, PRINT NOTIFICATION<br>· DISTRIBUTION BY EACH DESTINATION<br>· SEND TIME DESIGNATION<br>· SEND HOLD | · SPOOL MAIL NUMBER<br>· SPOOL MAIL SIZE<br>· SPOOL MAIL<br>· SEND WAITING MAIL<br>· UNRECEIVED MAIL | · INFORMATION NOTIFICATION<br>· MAIL DELETION<br>· MAIL SENDING |

| | ON MAIL RECEIVING | |
|---|---|---|
| | INFORMATION | FUNCTION |
| | · SENDER MAIL ADDRESS<br>· RECIPIENT MAIL ADDRESS<br>· DESTINATION MAIL ADDRESS<br>· CC MAIL ADDRESS<br>· TRANSMISSION PATH<br>· SUBMISSION DATE AND TIME<br>· SUBJECT<br>· BODY LENGTH<br>· BODY<br>· ATTACHED FILE | · RECEIVE ACCEPTANCE<br>· RECEIVE REJECTION<br>· REPLY<br>· TRANSFER<br>· RECEIPT NOTIFICATION<br>· TRANSFER OR RECEIPT NOTIFI-<br>CATION TO TELEPHONE, FAX etc.,<br>· PRINT, PRINT NOTIFICATION<br>· DIRECTORY DISTRIBUTION BY<br>EACH SENDER<br>· SUBJECT CHANGE (EMPHASIS)<br>· SAVE AS FILE |

FIG. 4

REQUEST PROGRAM MAKING

| USER NAME | HIROKAZU OHI |
| PASSWORD | ******** |
| MAIL ADDRESS | ohi@abcd.efg.jp |
| EVENT | RECEPTION OF MAIL ADDRESSED TO ME |
| REQUEST 1: INFORMATION | SENDER MAIL ADDRESS |
| REQUEST 1: CONDITION | INCLUDING "hijk.lmn.jp" |
| REQUEST 1: ACTION | RECEIVE REJECTION |

[SEND REQUEST PROGRAM] [CANCEL]

FIG. 14

| INFORMATION | FUNCTION | INFORMATION | FUNCTION |
|---|---|---|---|
| · SERVER NAME<br>· SERVER ADDRESS<br>· URL<br>· Content-Type<br>· Content-Length<br>· Authorization<br>· OTHERS OF HTTP HEADER<br>· BODY | · SEND ACCEPTANCE<br>· SEND REFUSAL<br>· USER APPROVAL<br>· ENCHIPHERING<br>· TRANSLATION<br>· CHARACTER CODE CONVERSION | · CACHE NUMER<br>· CACHE SIZE<br>· CACHE<br>· OBTAIN NUMBER<br>· SEND NUMBER<br>· OTHERS OF LOG | · CACHE OPERATION<br>· LOG OPERATION<br>· INFORMATION NOTIFICATION |
| ON PAGE SENDING | | TIME OUT | |

| INFORMATION | FUNCTION |
|---|---|
| · SERVER NAME<br>· SERVER ADDRESS<br>· URL<br>· Content-Type<br>· Content-Length<br>· WWW-Authenticate<br>· OTHERS OF HTTP HEADER<br>· BODY | · OBTAIN ACCEPTANCE<br>· OBTAIN REFUSAL<br>· USER APPROVAL<br>· ENCHIPHERING<br>· TRANSLATION<br>· CHARACTER CODE CONVERSION<br>· BROWSER COMPLIANT<br>· CACHE |
| ON PAGE OBTAINING | |

FIG. 17

|  |  | USER A | USER B | USER C | ... |
|---|---|---|---|---|---|
| PASSWORD |  | abcd | efgh | ijkl |  |
| REQUEST ACCEPTANCE |  | YES | YES | No |  |
| FUNCTION ON MAIL RECEIVING | RECEIVE ACCEPTANCE | YES | YES | No |  |
|  | RECEIVE REJECTION | YES | No | No |  |
|  | REPLY | YES | No | No |  |
|  | TRANSMISSION | YES | YES | No |  |
|  | RECEIPT NOTIFICATION | YES | YES | No |  |
|  | TRANSFER TO TELEPHONE, FAX ETC. | No | YES | No |  |
|  | PRINT, PRINT NOTIFICATION | YES | YES | No |  |
|  | DIRECTORY DISTRIBUTION BY EACH SENDER | No | No | No |  |
|  | SUBJECT CHANGE (EMPHASIS) | YES | No | No |  |
|  | SAVE AS FILE | YES | YES | No |  |
|  | ⋮ | ⋮ | ⋮ | ⋮ | ⋮ |

1901 → USER A; 1902 → USER B; 1903 → USER C
1904 → PASSWORD; 1905 → REQUEST ACCEPTANCE; 1906 → FUNCTION ON MAIL RECEIVING

SERVER, CLIENT, CLIENT SERVER SYSTEM, METHOD FOR CONTROLLING THEM AND STORAGE MEDIUM THEREFOR

BACKGROUND OF THE INVENTION

1. Field of the Invention

The present invention relates to a server, a client, a client server system, a method for controlling them, and a storage medium therefor.

In particular, this invention relates to a server, a client, a client server system, a method for controlling them, and a storage medium therefor wherein the safety of the server is maintained when a request from the client is embedded into the server.

In addition, this invention relates to a server, a client, a client server system, a method for controlling them, and a storage medium therefor wherein the safety of the server is also maintained when a request from the client is executed.

2. Related Background Art

There are conventionally various client server systems, and in each system, a server provides services to a client.

For example, in an E-mail (hereafter simply referred to as a "mail") system, in case of transmitting a mail, a mail made on a client machine is sent to a mail server according to a mail protocol such as SMTP (Simple Mail Transfer Protocol).

The mail server sees the destination of the mail to determine the address of a mail server to which a receiver belongs in order to send the mail to this mail server.

Upon receiving the mail, the mail server places the mail in a spool for the receiver. When the receiver uses, for example, the POP3 protocol to access the mail server in order to check the received mail, the mail server obtains the mail from the spool to transmit it to the receiver's client machine.

Such a mail system provides various mail services in addition to mail transmissions and receptions. A filtering function for saving mails to different mail boxes depending on the contents or types of the mail and rejecting the mail reception depending on the mail sender is important to, for example, users who receive a large amount of mails per day.

This filtering function is conventionally executed by a mail application on the client side or is implemented by the mail server executing a filtering program on all mails or mails concerning selected mail addresses.

The realization of the filtering function of the conventional mail system, however, had the following problems. That is, if a mail application executed filtering, even an unwanted mail that was to be deleted remained in the spool on the mail server until the user accessed the mail to shift it to the client machine. Consequently, the disc capacity on the mail server was consumed.

In addition, even with common filtering processing that many users desire to set, settings are required on the mail application of each client.

If a filter program embedded in the mail server carries out filtering, only the supervisor having a supervisor privilege can normally incorporate the filter program into the mail server, whereas users are not free to do so. Even if the supervisor performs this operation, the supervisor's burdens increase.

Furthermore, various filter programs are required to meet users' diverse requirements. Thus, the stability and safety of the filter program cannot be easily maintained, so the stability of the mail system may be degraded.

In addition, as another example of a client server system, the World Wide Web (hereafter referred to as "WWW") system allows a Web browser acting as a client to access a Web server through the Hyper Text Transfer Protocol (hereafter referred to as "HTTP") in order to obtain pages described using the Hyper Text Markup Language (hereafter referred to as "HTML") on the Web server. The Web browser can then interpret the contents of the pages to display them on the screen of the client machine.

The WWW system is globally popular, and its powerful link mechanism provides simple accesses to Web servers throughout the world.

On the other hand, the ability to simply access Web servers to display information on the screen has made new problems. For example, children must be protected from harmful information.

Conventionally, to deal with this problem, the Web server transmitted a web page with a note indicating that this was harmful information, or a supervisor registered pages for harmful information in a proxy server to allow the indication of such pages to be determined, or the user registered pages for harmful information in the Web browser to allow the indication of such pages to be determined.

However, in order to recognize harmful pages using the Web browser, a recognition mechanism must be embedded in the Web browser. Criteria with which to determine that the information is harmful vary with the age or trend, so the recognition mechanism must be constantly updated. It takes a large amount of time and labor for individual Web browsers to perform update operations.

In addition, if the proxy server recognizes harmful pages, the supervisor must register such pages depending on individual users' requirements, requiring a large amount of time and labor. In addition, if the Web server limits the obtention of pages and if no user recognition mechanism according to HTTP is used, the client machine can be identified whereas the user using the client machine cannot be identified, so harmful information may not be eliminated appropriately.

A user approval mechanism according to HTTP enables the user to be approved, but to achieve this requires this mechanism to be enabled on the Web server. Harmful-information senders rarely enable the user to approve, the fact that may reduce the information access frequency, so this is neither effective means.

As described above, despite its ability to execute processing according to a certain protocol, the conventional client server system cannot appropriately implement more flexible functions and services that attentively meet users' needs.

Extension of the protocol may enable some of these services to be implemented, but such extension must be very large in order to meet users' diverse requests and it is difficult to create a server program that can cope with all extended portions. In addition, there is a problem that such a server program is not compatible with conventional server programs.

SUMMARY OF THE INVENTION

It is thus an object of the present invention to provide a server, a client, a client server system, a method for controlling them, and a storage medium therefor wherein the server can safely execute a request from the client.

In particular, it is an object of this invention to provide a server, a client, a client server system, a method for controlling them, and a storage medium therefor wherein before providing a service to the client, the server publishes part of its information and functionality to the client so that the client can create a request for a service based on the published information and so that the server can then safely execute the request.

To attain these objects, this invention has the following configuration.

A server according to this invention is characterized by comprising:

request receiving means for receiving a request from a client;

judging means for determining whether the request received by the request receive means is invalid;

embedding means for embedding the request that has not been determined to be invalid into processing executed by the server; and executing means for executing the processing into which the request has been embedded by the embedding means.

The judging means is preferably characterized in that before executing the processing into which the request has been embedded, the judging means redetermines Whether the request is invalid.

The server is preferably characterized by further comprising information transmitting means for transmitting the predetermined information from the server to the client.

The server is preferably characterized in that:

the request receiving means receives as the request a request program in a program form, in that:

the judging means determines whether the received request program is invalid, and in that:

the embedding means embeds the request program that has not been determined to be invalid into the processing executed by the server.

The server is preferably characterized in that it further comprises a program making means for making a request program based on the request, and in that:

the embedding means embeds the request program made by the program making means into the processing executed by the server.

In addition, a client according to this invention is characterized by comprising:

information receive means for receiving the predetermined information from the server;

request making means for making a request based on the predetermined information from the server; and request transmitting means for transmitting the made request to the server.

The client is preferably characterized in that:

the request making means makes a request program as the request, and in that:

the request transmitting means transmits the request program as the request.

In addition, a client server system according to this invention comprising a server and a client is characterized in that:

the server comprises:

information transmitting means for transmitting predetermined information from the server to the client;

request receiving means for receiving a request from the client;

judging means for determining whether the request received by the request receiving means is invalid;

embedding means for embedding the request that has not been determined to be invalid into the processing executed by the server; and executing means for executing the processing into which the request has been embedded by the embedding means, and in that the client comprises:

information receiving means for receiving predetermined information from the server;

request making means for making a request based on the predetermined information from the server; and request transmitting means for transmitting the made request to the server.

The system is preferably characterized in that before executing the processing into which the request has been embedded, the judging means re-determines whether the request is invalid.

Preferably, the client is characterized in that:

the request making means makes a request program as the request, and in that:

the request transmitting means transmits the request program as the request, and the server is characterized in that:

the request receiving means receives the request program:

the judging means determines whether the received request program is invalid, and in that:

the embedding means embeds the request program that has not been determined to be invalid into the processing executed by the server.

The system is preferably characterized in that the server further comprises a program making means for making a request program based on the request from the client, and in that:

the embedding means embeds the request program made by the program making means into the processing executed by the server.

Although the means configurating the server, the client, and the client server system have been described, an information processing apparatus or an operation system may be responsible for part or all of the above configuration. This invention also includes a server controlling method, a client controlling method, and a client server controlling method that are achieved by steps similar to the above means, as well as a storage medium recording programs for these steps thereon.

In addition, according to this invention, the server determines whether a request from the client is invalid, so the server and the system can be safely operated to reduce a supervisor's burdens. In addition, since the request from the client which has not been determined to be invalid is embedded into the processing executed by the server, more flexible functions and services that attentively meet users' needs can be implemented to significantly extend the functions of the server and system.

In addition, at the time of executing the processing into which the request has been embedded, it is determined whether the request is invalid, so the server and the system can be safely operated even if the request that was determined to be safe upon embedding is re-determined to be harmful upon execution.

In addition, since the server transmits to the client predetermined information such as the server's application interface and the client makes a request based on the server's predetermined information, the protocol for the conventional client server system does not need to be extended, so this invention is highly compatible with the conventional system. Only the function must be added for publishing an interface that is information such as the conventional server's functions and embedding and effectuating a request, so this invention can collaboratively and harmoniously operate with the conventional server have high affinity and hold high processing capabilities.

In addition, since the client makes a request program and transmits it to the server, which then embeds it into processing, the server does not need to create a request program, thereby saving the server's burdens.

In addition, if the server makes a request program based on a request from the client, the request program is not transmitted from the client to the server through a network, thereby preventing the program from being plagiarized, altered, or disguised. This configuration also eliminates the need to check the syntax of the program.

In addition, the request embedded into the processing executed by the server can be deleted based on an instruction from the client to enable arbitrary deletion for the client's convenience, thereby improving usefulness.

In addition, the client can inquire for the request embedded in to the processing executed by the server to check what request is being executed by the server.

The other objects and advantages of this invention will be apparent from the following detailed description, accompanying drawings and claims.

BRIEF DESCRIPTION OF THE DRAWINGS

FIG. 2 is a table showing an application programming interface of a server 101;

FIG. 4 shows a display screen of the client 201 displayed in making a request making program;

FIG. 14 is a table showing an application programming interface of a proxy server 401;

FIG. 17 shows part of a user database stored in a memory portion 109 of the server 101 according to the first embodiment.

DETAILED DESCRIPTION OF THE PREFERRED EMBODIMENTS

Preferred embodiments of this invention will be described below with reference to the drawings.

FIRST EMBODIMENT

Figure 1:
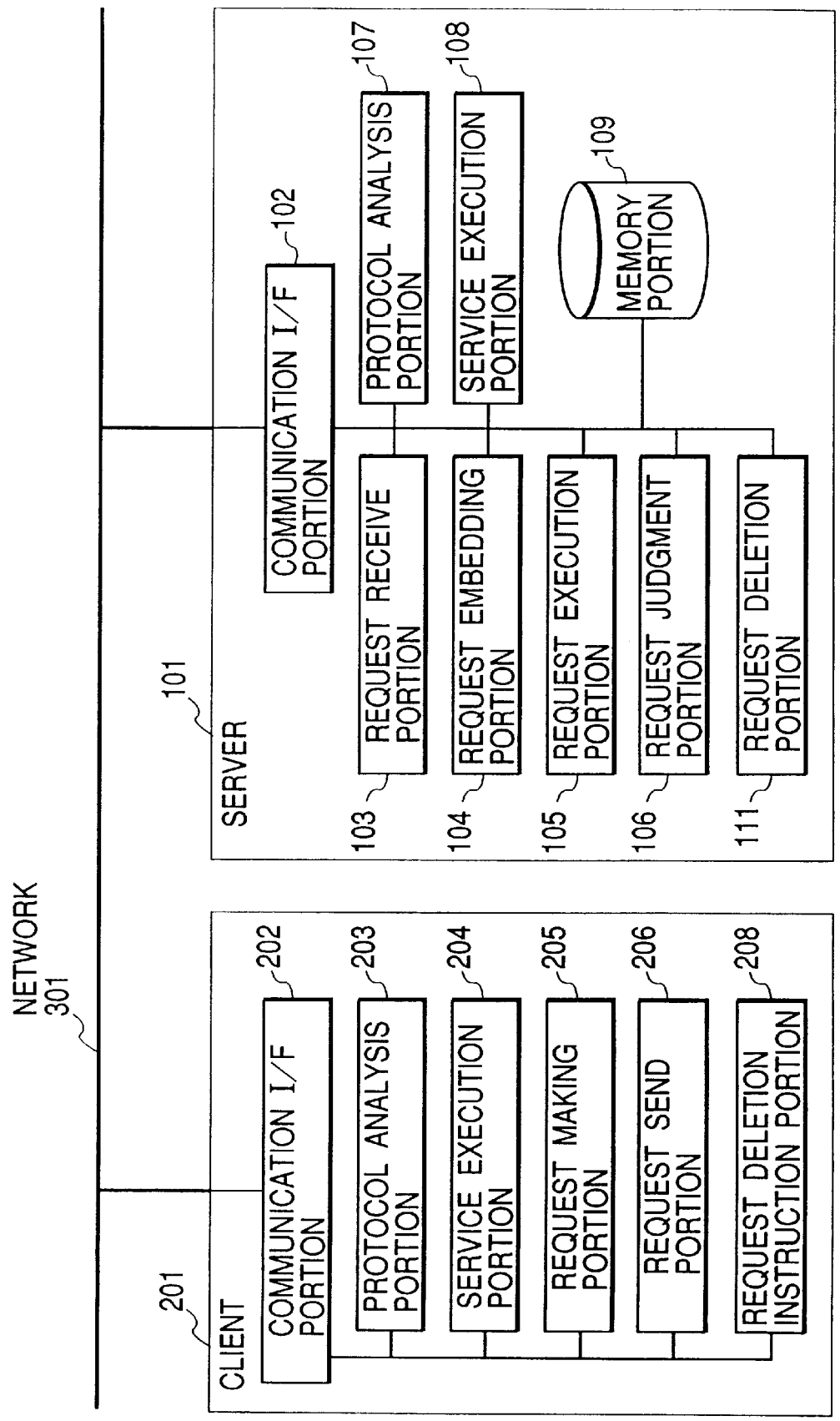
FIG. 1 is a block diagram showing a configuration of a mail system according to a first embodiment.

A client server system according to a first embodiment is applied to a mail system. FIG. 1 is a block diagram showing a configuration of a mail system according to the first embodiment. In this figure, a server 101 is a mail server.

The server 101 has a communication I/F portion 102 acting as an interface with a network 301, a request receive portion 103 for receiving a request from a client 201, a request embedding portion 104 for embedding the request received by the request receive portion 103 into a series of action processing executed by the server 101, a request execution portion 105 for executing the request, a request judgement portion 106 for determining whether the request contains data that jeopardizes the safety or security of the system or whether the contents of the request fall within the authority permitted for the requester, a request deletion portion 111 for deleting the request, a protocol analysis portion 107 for analyzing a mail protocol, a service execution portion 108 for executing a mail service, and a memory portion 109. The memory portion 109 stores mail data, action programs and data, and request programs including the contents of requests.

On the other hand, a client 201 is a mail client. The client 201 has a communication I/F portion 202 acting as an interface with the network 301, a protocol analysis portion 203 for analyzing a mail protocol, a service execution section 204 for executing a mail service, a request making portion 205 for making the request, a request sending portion 206 for sending the server 101 the request made by the request making portion 205, and a request deletion instruction portion 208 for instructing the request to be deleted.

Figure 16:
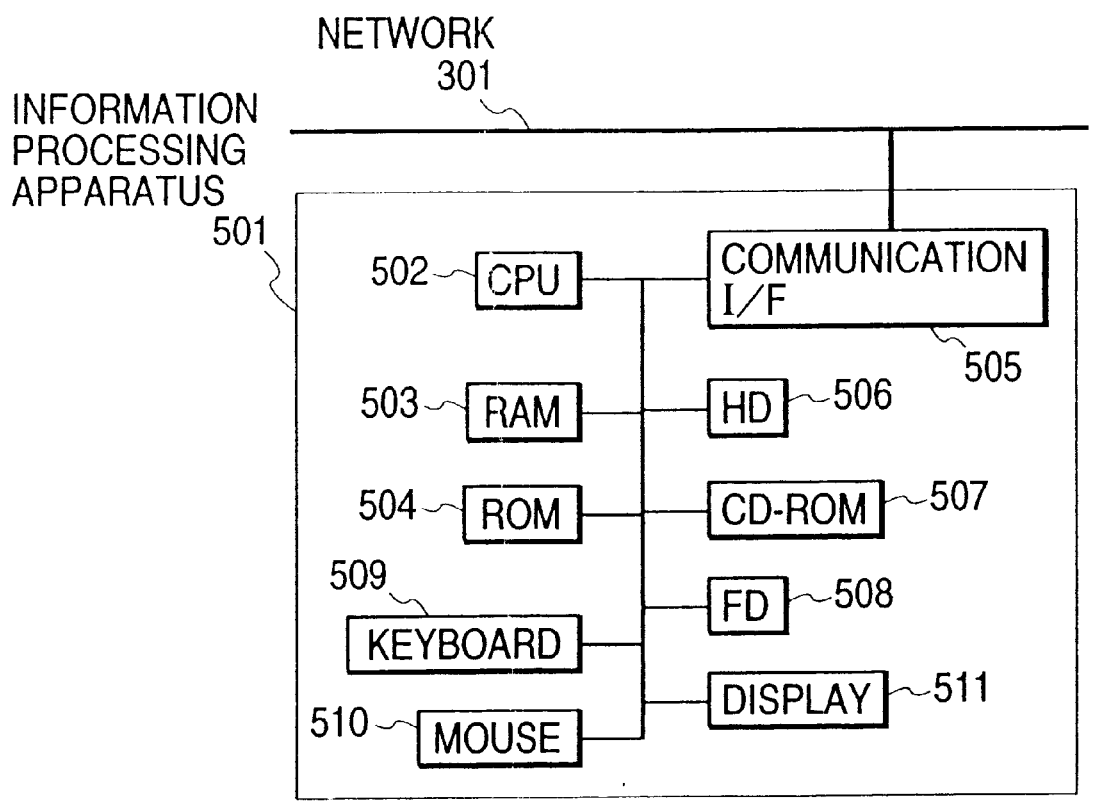
FIG. 16 shows an example of a configuration of an information processing apparatus that can implement a server and a client according to this invention.

The server 101 and the client 201 can be implemented using the same configuration as in an information processing apparatus 501, which is shown in FIG. 16. The information processing apparatus 501 consists of a CPU 502 that actually executes processing and a RAM 503; an HD (hard disc) 506, a CD-ROM 507, an FD (a floppy disc drive) 508, a ROM 504 that are memory means; a communication interface 505 that communicates with other information processing apparatuses; a keyboard 509 and a mouse 510 that are input means; and a display 511 that is display means.

The CPU 502 reads out program codes stored in the HD 506, CD-ROM 507, or FD 508, into the RAM 503 as required and execute them to implement the components o f the server 101 and client 201 shown in the block diagram in FIG. 1.

Specifically, program codes corresponding to each step of the flowcharts (FIGS. 3, 5, 6, 7, 8 and 9) used for the following embodiments are stored in the memory means such as the HD 506, the CD-ROM 507, or the FD 508, and the CPU 502 reads out the program codes into the RAM 503 as required to execute them in order to implement this invention.

In addition, the information processing apparatus reads out program codes corresponding to each component from another information processing apparatus into the RAM 503 through a network or the like, where the CPU 502 executes these codes to implement each component of the block diagram in FIG. 1.

Prior to description of the operation of the mail system configured as described above, the request will be specifically explained.

The mail system does not permit every request to be freely made but imposes a certain limitation to maintain the safety of the system. This limitation is based on the functions provided by the server 101. The server 101 does not open all the functions to the request. Since the request is externally added processing, the server 101 opens only some of its functions so as not to jeopardize the safety of the system or to degrade performance.

When a function of the server 101 is executed upon a request, the request program itself must know part of the information of the server 101 whether it is static information or dynamic information that is obtained during service execution. In this case, the server 101 opens only part of its information to the request so as not to jeopardize the safety.

These functions and information are integrated into a form of an application programming interface (hereafter referred to as an "API").

FIG. 2 shows the API of the server 101 in a table. Events that trigger request execution include mail transmissions and receptions and timeouts for certain set times. The information column shows the types of information that can be provided by the server 101 upon an event occurrence. The function column shows the types of function that can be provided by the server 101 upon an event occurrence.

A request consists of information, a condition to be met by the information, and a function executed when the above described condition is met. A complicated condition may use a plurality of pieces of information and cause a plurality of functions to be executed.

As an example of the request, it is contemplated that if upon a mail reception (event), a sender mail address (information) includes hijk.lmn.jp (condition), the reception can be rejected (function) to discard this mail. It is also contemplated that spool mails (information) can be checked at a specified time of a day (timeout event) to delete (function) mails that have existed in the server for one month or longer since the receive date (condition).

Figure 3:
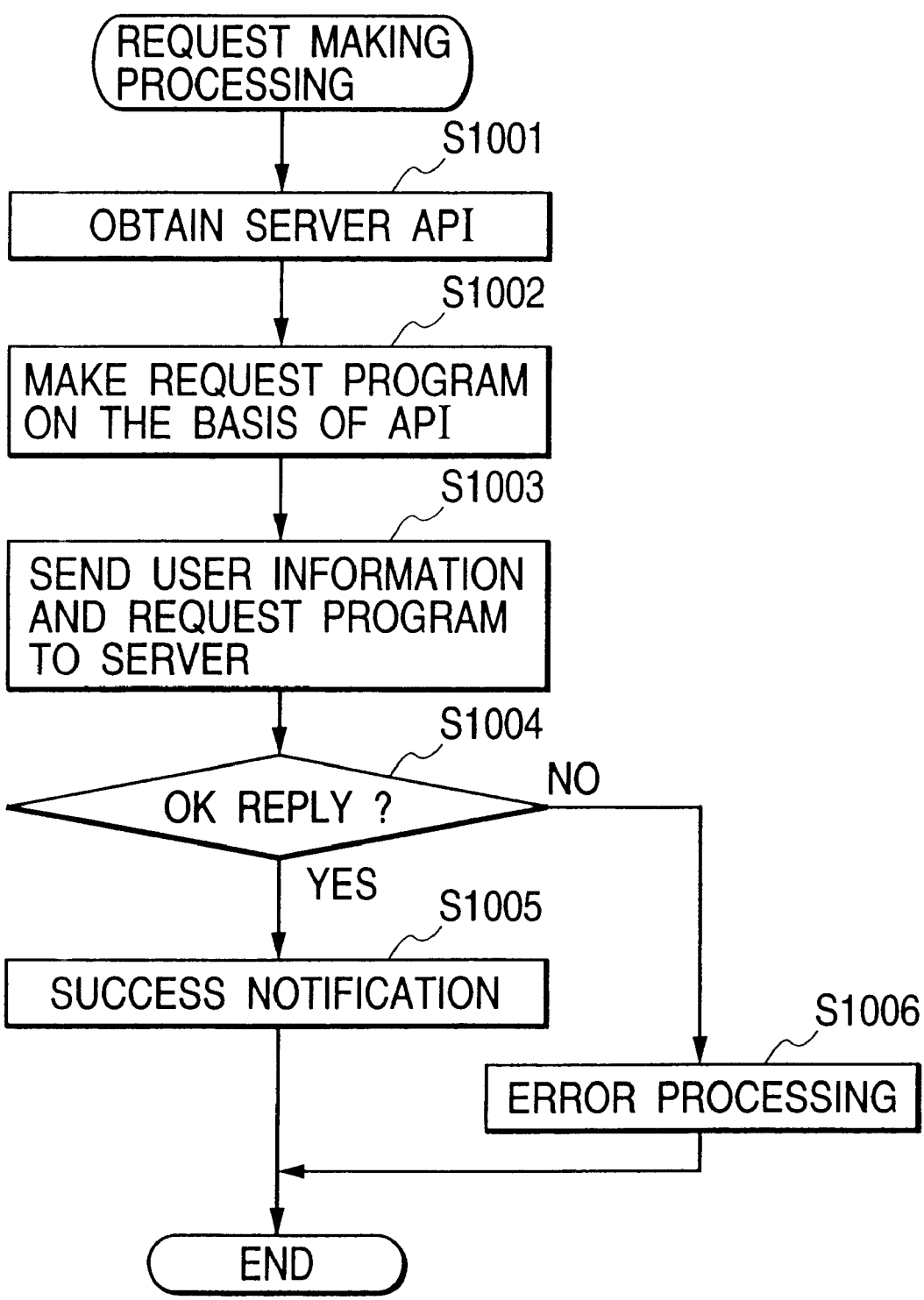
FIG. 3 is a flowchart showing a request making processing procedure executed by a client 201.

The operation of the mail system configured as described above will be described. FIG. 3 is a flowchart showing a request making processing procedure. The request making portion 205 and the request send portion 206 execute this processing. A CPU (not shown) executes program codes stored in a memory portion (not shown) in the client 201 to implement the request making portion 205 and request send portion 206 in FIG. 3.

In this request making processing, the API of the server 101 is first obtained (step S1001). Various API obtaining methods are contemplated. For example, the API can be obtained by making an inquiry to the server 101 each time an request is made or previously downloading the API into the client 201 so that it can be referenced later when a request is made. Furthermore, it can be obtained in the form of a printed paper medium. In addition, all of the API does not need to be obtained at once but only the required information of the API can be obtained when it must be referenced during request making.

Although the user can use the API to directly make a request program, a safer and more preferable method is to provide a request making program that accepts users' parameter inputs and that makes a request program by referencing the API. Such a request making program is used to make a request program based on the API (step S1002).

In this case, the request making program implements the request making portion 205. Safer programs that make few logical errors can be made by limiting user inputs to parameters. FIG. 4 shows a display screen of the client 201 displayed in making a request program using the request making program. This figure shows an example using a GUI (Graphical User Interface).

The user inputs a user's name, a password, the user's own mail address, an event that triggers the execution of this request, information defined in the API that is used for the request 1, a condition that must be met by the information in executing the function for the request 1, and the specific contents (action) of the function executed for the request 1. If a plurality of requests are present, these inputs are provided for each request.

In FIG. 4, "event", "request 1: information" and "request 1: action" should be selected from the API and can be selected from an item list permitted by the API. The input example in this figure makes a request program functional upon receiving a mail for ohi@abcd.efg.jp (event) for rejecting the reception and discarding this mail function if the sender mail address (information) includes hijk.lmn.jp (condition).

The user's name and the password are inputted because user approval is required to allow the server 101 to check whether the user is permitted to make a request program.

When the user depresses the [request program send] button after inputting each item, the request making portion 205 makes a request in the form of a program and the request send portion 206 sends the server 101 user information comprising the user ID and the password as well as the created request program (step S1003). The request program made by the request making portion 205 is transmitted in the form of a program so that the server can check it for its syntax or the contents of the request. Any format types of request programs may be usable as far as a server can interpret or execute the request program: directly executable programs as is by server CPUs, intermediate codes or source codes. As long as intermediate or source codes are chosen, request programs can be executed irrespective of types of server CPUs so that intermediate codes or source independents of server CPUs. In that case, the program can be easily checked if requests in the program jeopardize the safety of the system since interpretation steps are incorporated at the time before execution of the request programs.

Arbitrary protocols can be used to obtain the API and to send the user information and the request program as long as the server 101 can interpret them. An extended version of the SMTP or a proprietary protocol may be used. Furthermore, if a Web server is run on the server 101, the HTTP may be used.

After sending the request program to the server 101, the request making portion 205 waits for the server 101 to accept the request program and to return an OK message (step S1004). If the reply is OK, the screen of the client 201 indicates the success to inform the user of it (step S1005) and the processing is finished.

On the other hand, if the reply is NG, the error is communicated (step S1006) to the user to finish the processing. If possible, a request is made again.

The number of request programs that can be made is not limited to one per client 201 or user, but in some cases, a single user can make a plurality of request programs and have them executed. Whether this operation is permitted depends on the security policy of the mail system.

This embodiment allows the client 201 to make a request program, but once a request program has been made, it can be sent not only to the server 101 but also to other servers using the same API. The request program that has been transmitted to the server 101 can also reproduce itself to send these programs to other servers.

Figure 5:
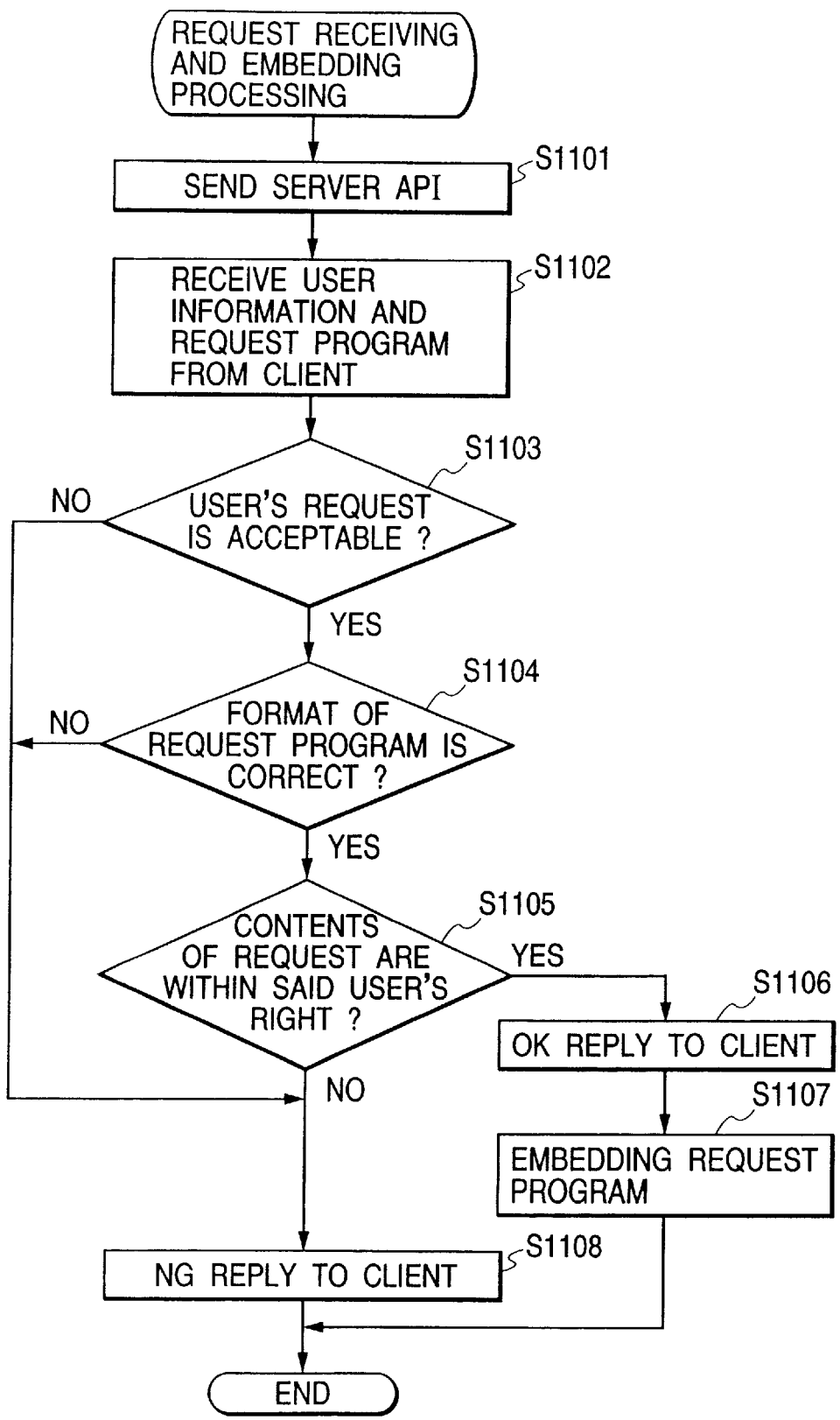
FIG. 5 is a flowchart showing a request receive and embedding procedure executed by the server 101.

FIG. 5 is a flowchart showing a request receive and embedding processing procedure executed by the server 101. The request receive portion 103 and the request embedding portion 104 execute this processing. The CPU (not shown) executes program codes stored in the memory portion in the server 101 (not shown) to implement the request receive portion 103, the request embedding portion 104, and the receive judgement portion 106.

First, if the API of the server 101 is requested, the request receive portion 103 sends the API (step S1101). As described above, the transmission of the API is not always required for this phase.

The server waits for the client 201 to send user information and a request program, and the request receive portion 103 then receive the information and program (step 1102). By referencing a user database stored in the memory portion 109, the request judgement portion 106 checks whether the user's password is correct and whether the user is permitted to issue a request using a request program (step S1103).

FIG. 17 is a table indicating the user database stored in the memory portion 109. The columns of USER A 1901 to USER C 1903 indicate what authorities each user has.

Step 1103 checks the user's password 1904 of the user and whether the column of the request possibility 1905 is "YES". If the result of the check is positive, the process checks whether the syntax of the request program is correct, that is, whether the program includes an instruction other than those specified or whether the program contains a binary value that is totally non-interpretable (step S1104).

If the result of the syntax checking for the request program is positive, the request judgement portion checks whether the contents of the request in the request program falls within the authority permitted for the user (step S1105). That is, no user is allowed to make a request for an excessive amount of function execution, a request that may cause the system to malfunction, or a request having destructive contents, for example, one for the deletion of other users' mails. It is also contemplated that different security policies may be set for different user levels, that is, certain functions are permitted only for users with a predetermined privilege level or higher. If, for example, the user who has made a request has a supervisor privilege, this user may have a powerful authority with which the user can check the spool mails of all the other users. The users' privilege level is checked by referencing a user database such as that shown in FIG. 17. Specifically, the request judgement portion checks in FIG. 17 whether the user has an authority corresponding to each function.

For example, the contents of the request program input in FIG. 4 requests that this user rejects the reception of the incoming mail, and this request, which ought to be within the user's authority generally, should be permitted.

If the results of the checks in steps S1103 to S1105 are all positive, the request judgement portion 106 returns an OK message to the client 201 (step S1106). Subsequently, the request embedding portion 104 embeds the request program into the series of mail service processing executed by the server 101 (step 1107) to finish preparing for request execution. The "embedding", as used herein, refers to storing the request program in the memory portion 109 to execute a series of processing (such as that shown in FIG. 6, which is described below) later. As regards this, the program is desirably stored in the memory portion in a form of intermediate or source codes that allows the program to be easily checked prior to actual execution.

On the other hand, if the result of the check in any of steps S1103 to S1105 is negative, the request judgement portion 106 returns an NG message to the client 201 (step S1108). In this case, the processing is finished without embedding the request program.

Figure 6:
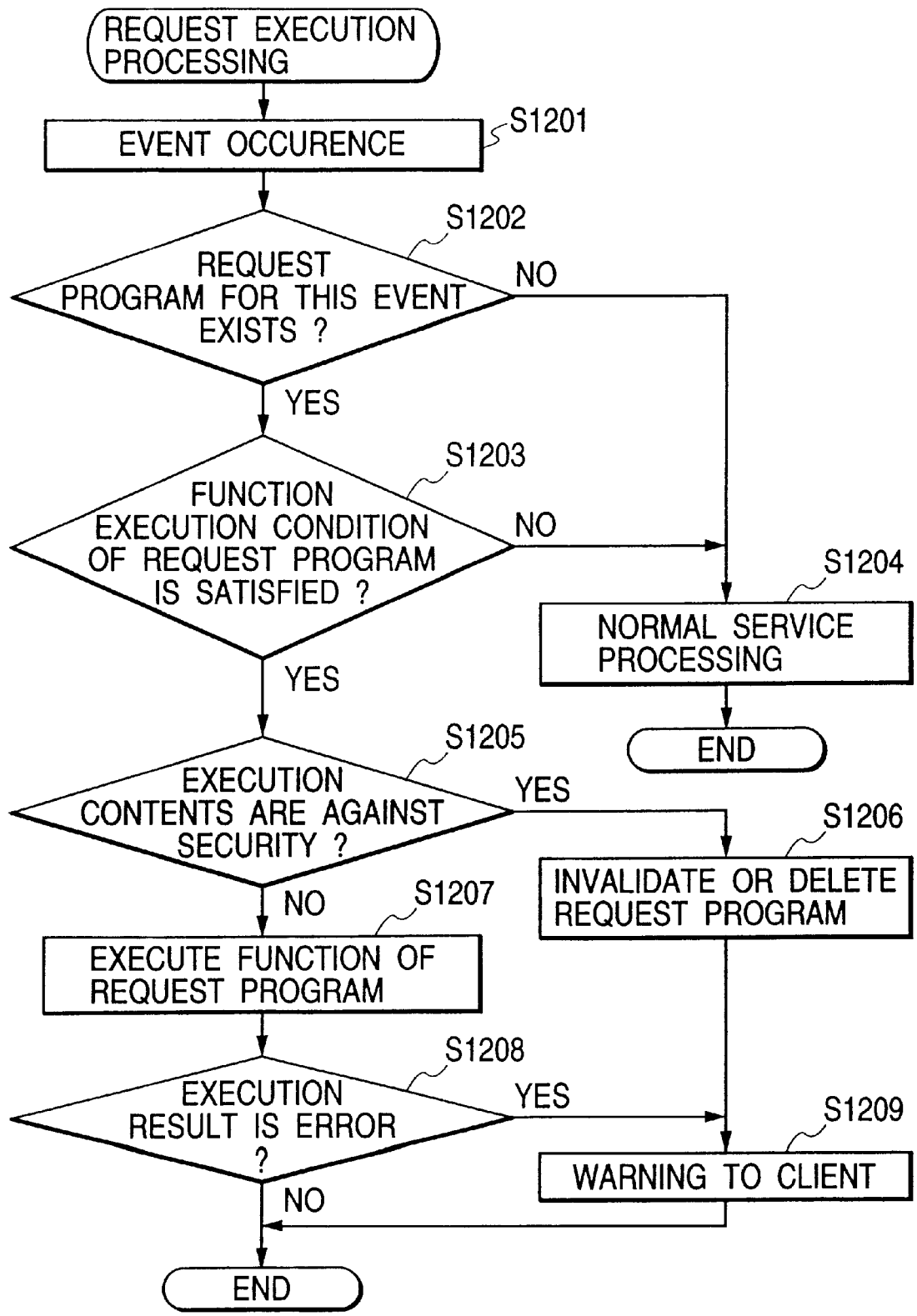
FIG. 6 is a flowchart showing a request execution processing procedure.
Figure 7:
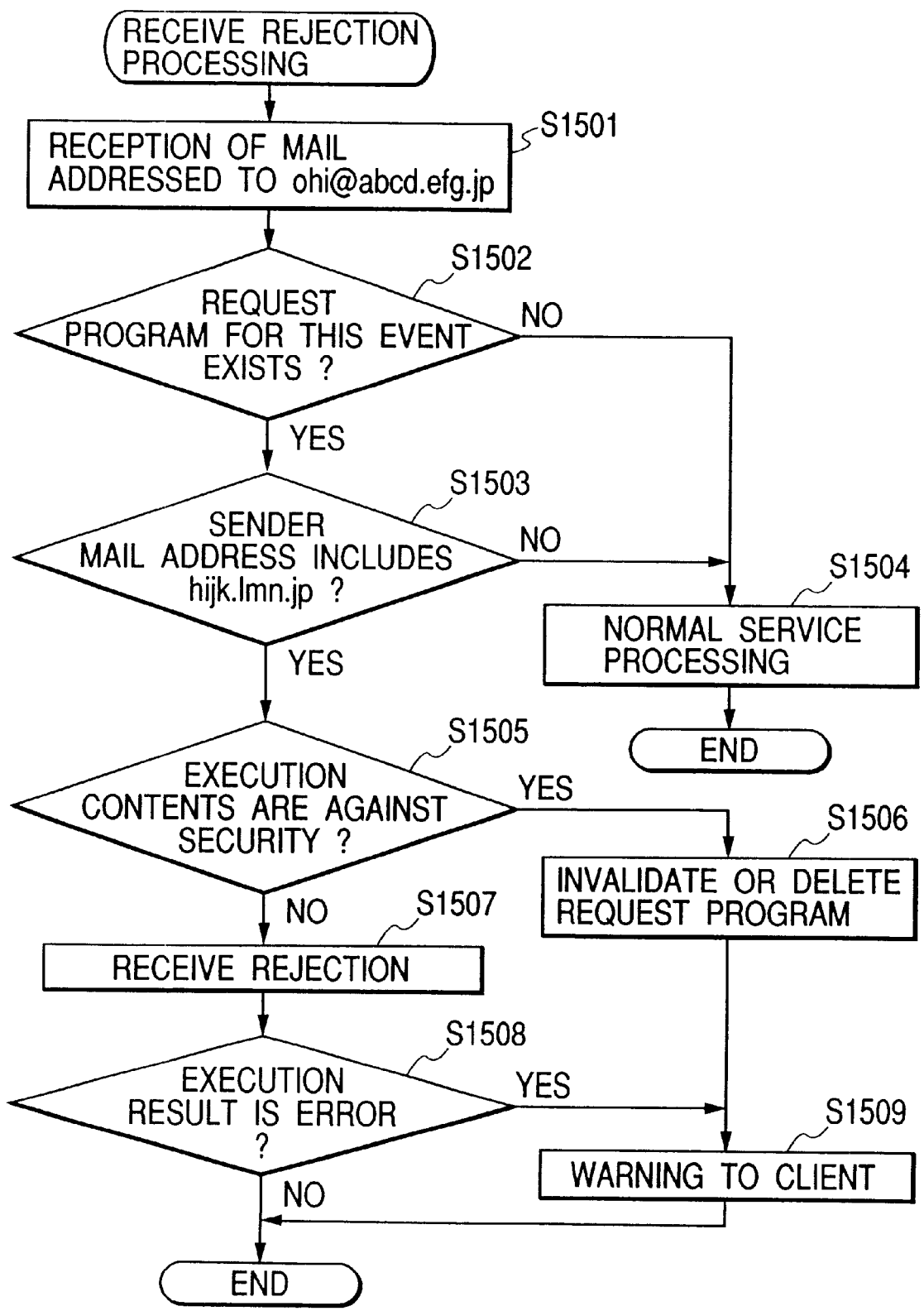
FIG. 7 is a flowchart showing a receive rejection processing procedure executed by a mail system as a specific example of FIG. 6.

FIG. 6 is a flowchart showing a request execution processing procedure. The request execution portion 105 and the request judgement portion 106 execute this processing. The CPU (not shown) executes program codes stored in the memory portion 109 in the server 101 to implement the request execution portion 105 and the request judgement portion 106. FIG. 7 is a flowchart showing as a specific example of the request execution processing in FIG. 6 a reception rejection processing procedure using the mail system shown in FIG. 4.

While the service execution portion 108 in the server 101 is executing a mail service, the process waits for a certain event to occur (step S1201), in the specific example, waits for a mail for ohi@abcd.efg.jp to reach the server 101 through the network 301.

The request execution portion 105 checks whether there is any request program to be activated for this event (step S1202, S1502). If there is no such request program, the normal mail service processing is carried out (step S1204, S1504).

Otherwise, if there is such request program, the request program is activated and the request execution portion checks whether the function execution condition is met (step S1203). The specific example checks whether the sender mail address includes hijk.lmn.jp (step S1503).

If the function execution condition is not met, and in the specific example, if the sender mail address does not include hijk.lmn.jp, the normal mail service processing is carried out (step S1204, S1504).

Otherwise, the request judgement portion 106 executes pre-execution checks (steps S1205, S1505). Although the created request program has been checked for safety prior to embedding into the service processing as described above, the contents must also be checked prior to execution. The request program that was considered to be safe upon creation may be found harmful prior to execution.

If, for example, the remaining memory capacity of the memory portion 109 is small, the process must avoid executing a function for saving a large-scale mail to a file.

Thus, prior to execution, the request judgement portion checks whether the executed function should be permitted in view of the current system status, that is, whether it is against security (step S1205, S1505).

The request judgement portion may re-check during this processing (step S1205, S1505) whether the function executed by the request program falls within the authority of the user who has made this request. This contributes to strict security.

If the function is against security, the request program is disabled or deleted so as not to be activated again (step S1206, S1506). As regards this, if the degree of security violation is minor, this processing may be omitted.

A warning is then provided to the client 201 indicating that the request program has not been normally executed or that it has been disabled or deleted (step S1209, S1509).

On the other hand, if the function is not against security in step S1205 (S1505), the request execution portion 105 executes the function requested by the request program (step S1207). In the specific example, the reception of the mail is rejected and the mail is discarded (step S1507).

If the request program is stored in the memory portion in the intermediate or source code form, it is converted into a code form (binary codes) that can be executed by the CPU, prior to actual execution.

After the function has been executed, the request execution portion 105 checks whether the result of execution includes an error (step S1208, S1508). If so, the client 201 is warned about the error (step S1209, S1509). Otherwise, the process is successfully finished.

The above procedure is used to carry out the processing from request making to execution. This processing is continuously repeated as long as there is a request program. That is, once a request program is made, it is repeatedly executed.

Figure 8:
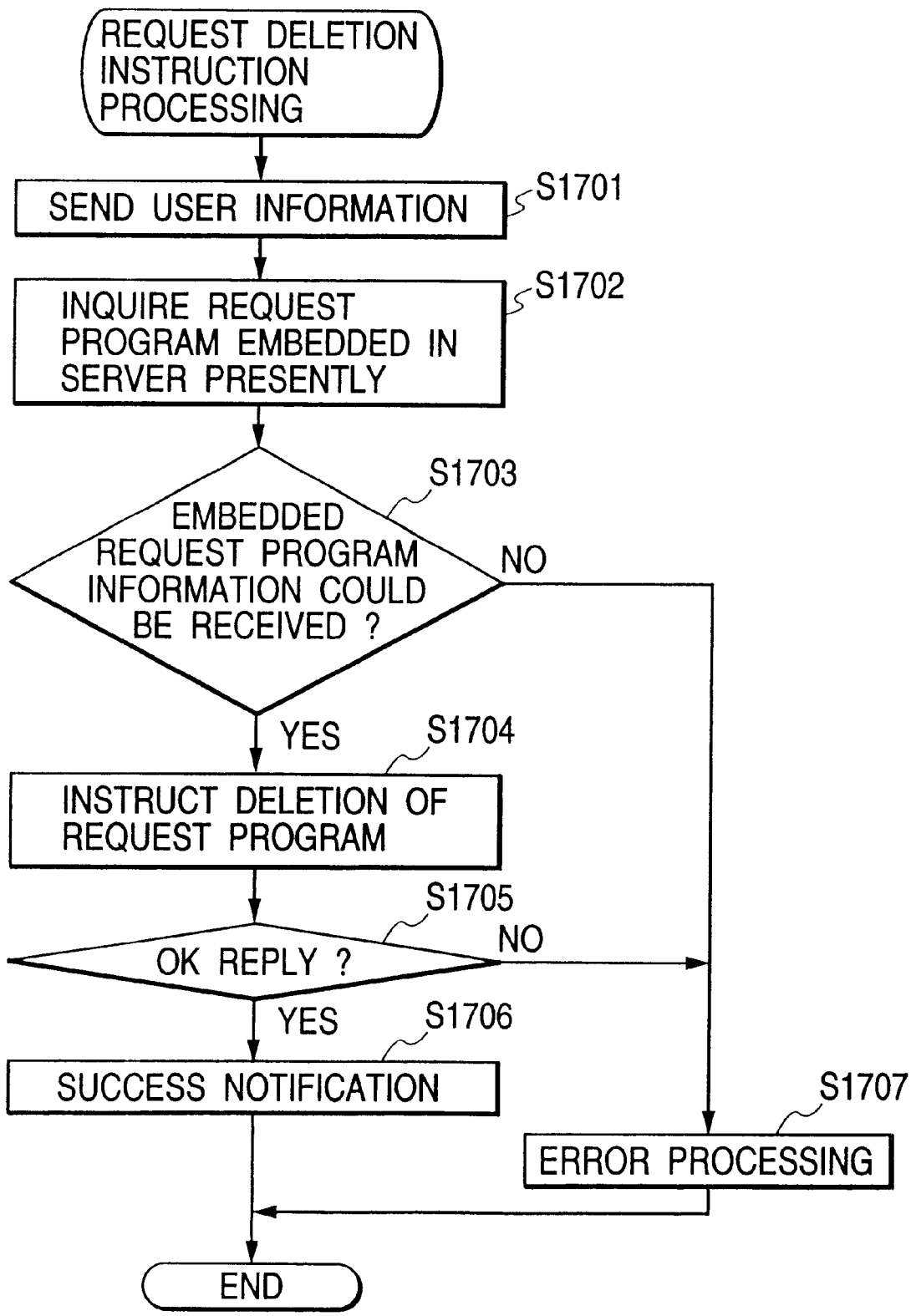
FIG. 8 is a flowchart showing a request deletion processing procedure executed by the client 201.

In addition, the user can delete the request program through the client 201. FIG. 8 is a flowchart showing a request deletion instruction processing procedure executed by the client 201. The request deletion instruction portion 208 executes this processing. The CPU (not shown) executes program codes stored in the memory portion (not shown) in the client 201 to implement the request deletion instruction portion 208.

First, the request deletion instruction portion 208 sends the server 101 user information consisting of a user ID and a password input by the user prior to a deletion instruction (step S1701).

The client inquires the server what the existing request program embedded by the user is (step S1702). If the user has an appropriate authority, even the request programs embedded by the other users can be inquired about. In this case, the limitation to the "request program embedded by this user" is eliminated.

The process determines whether the embedded request program information has been successfully received (step S1703). If the inquiry is successful, the server 101 returns information on the embedded request program, but otherwise, it returns an NG message. In the latter case, error processing is carried out (step S1707) to finish the processing.

On the other hand, if the inquiry is successful, the user selects a request program to be deleted based on the returned information on the request programs. Accordingly, the request deletion instruction portion 208 provides a deletion instruction to the server 101 (step S1704).

The request deletion instruction portion 208 waits for the result of processing executed by the server 101 (step S1705):, and notifies the user of success if the server returns an OK message (step S1706). If the server returns an NG message, the request deletion instruction portion 208 notifies the user of an error (step S1707). Subsequently, the processing is finished.

Figure 9:
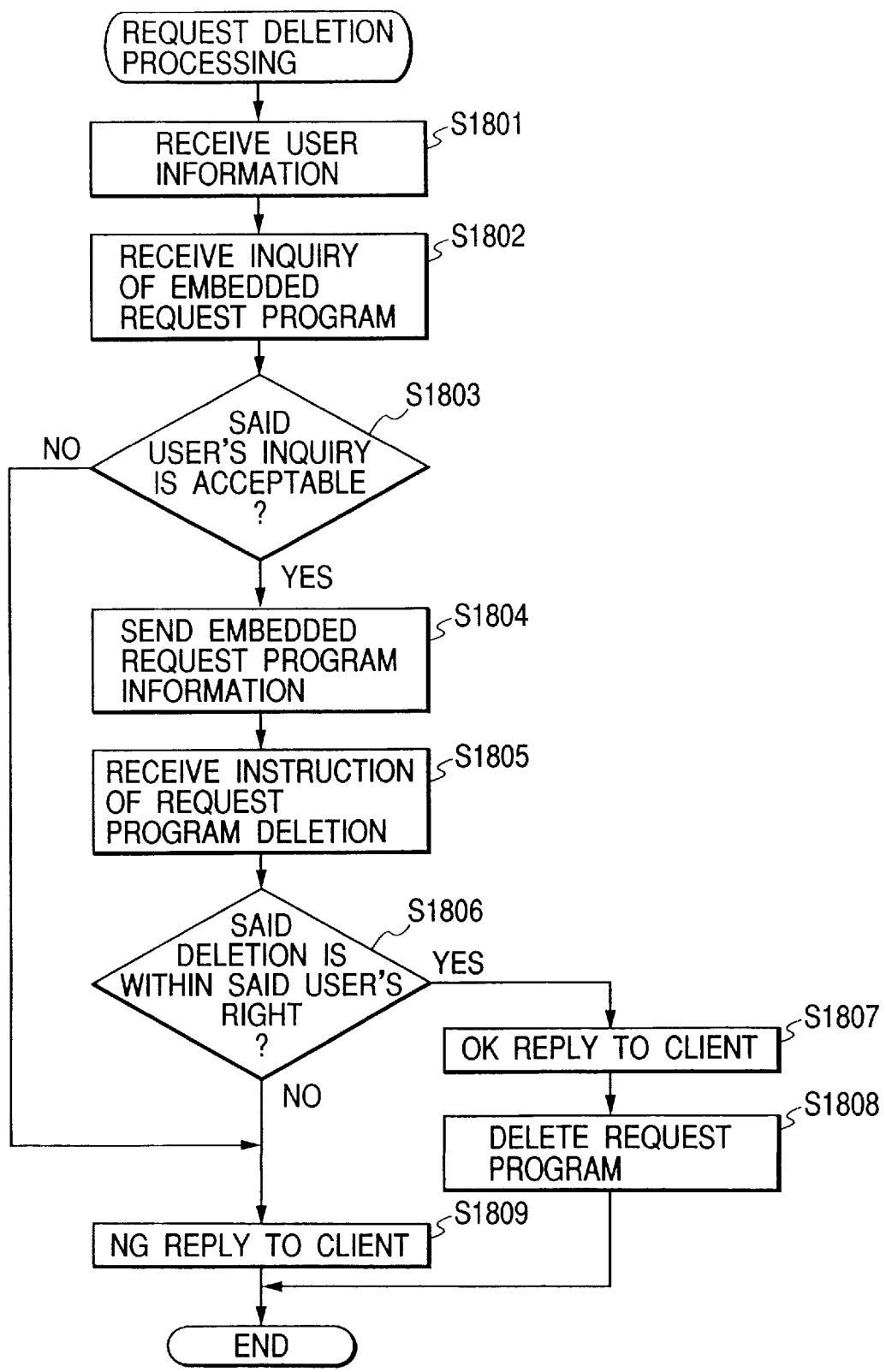
FIG. 9 is a flowchart showing a request deletion processing procedure executed by the server 101.

FIG. 9 is a flowchart showing a request deletion processing procedure executed by the server 101. The request deletion portion 111 executes this processing. The CPU (not shown) executes program codes stored in the memory portion (not shown) in the server 101 to implement the request deletion portion 111. The request deletion portion 111 receives user information from the client 201 (step S1801). It receives from the client 201 the inquiry about the existing request program embedded by this user (step S1802).

The request deletion portion 111 checks whether the user ID and the password are valid, that is, whether the user is valid, and further checks whether this user has an inquiry authority (step S1803).

If the result of any of these checks is negative, the request deletion portion returns an NG message to the client 201 (step S1809) to finish the processing. If the results of all checks are positive, the request deletion portion sends information on the embedded request programs (step S1804).

Then, the request deletion portion 111 receives a deletion instruction for the deletion of a certain request program (step S1805). This deletion instruction is not limited to one request program, but may involve a plurality of request programs.

The request deletion portion 111 checks whether the user has an authority to delete this request program (step S1806).

If not, the request deletion portion returns an NG message to the client 201 (step S1809) to finish the processing.

On the other hand, if the user has an authority to delete this request program, the request deletion portion returns an OK message to the client 201 (step S1807) and deletes this request program from the flow of service processing (step S1808) to finish the processing.

The above processing makes, sends, receives, embeds, executes, and judges a request, instructs it to be deleted, and deletes it.

SECOND EMBODIMENT

Figure 10:
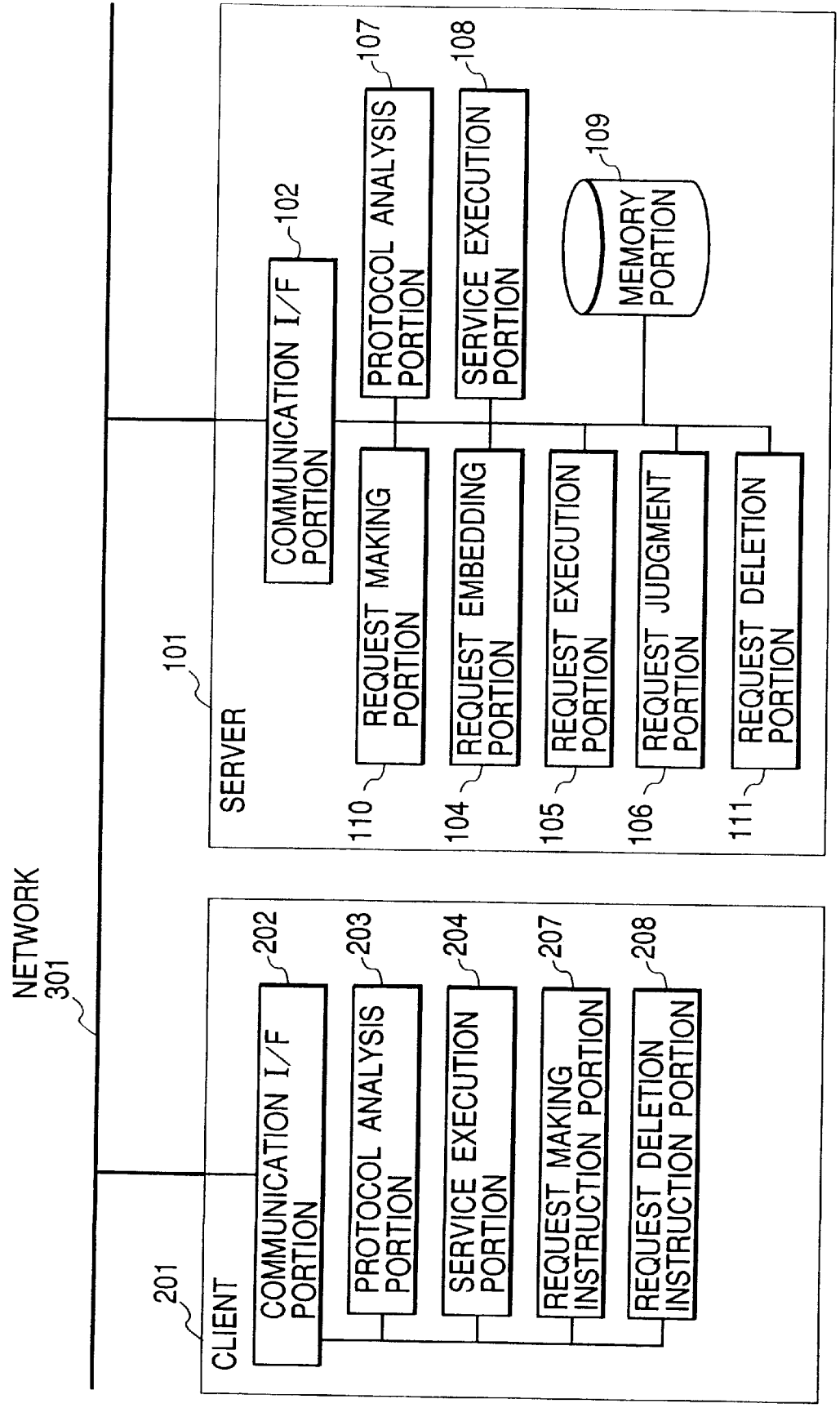
FIG. 10 is a block diagram showing a configuration of a client server system according to a second embodiment.

FIG. 10 is a block diagram showing a configuration of a client server system according to a second embodiment. This figure and FIG. 1 for the first embodiment differ in that in FIG. 1, the client 201 has the request making portion 205 and the request send portion 206 and the server 101 has the request receive portion 103, whereas in FIG. 10, the client 201 has a request making instruction portion 207 and the server 101 has a request making portion 110.

That is, according to the second embodiment, the client 201 does not make a request program but only instructs one to be made. The server 101 actually makes a request program. In this case, the request program does not flow through the network 301, thereby preventing eavesdropping, alteration, and disguise.

Figure 11:
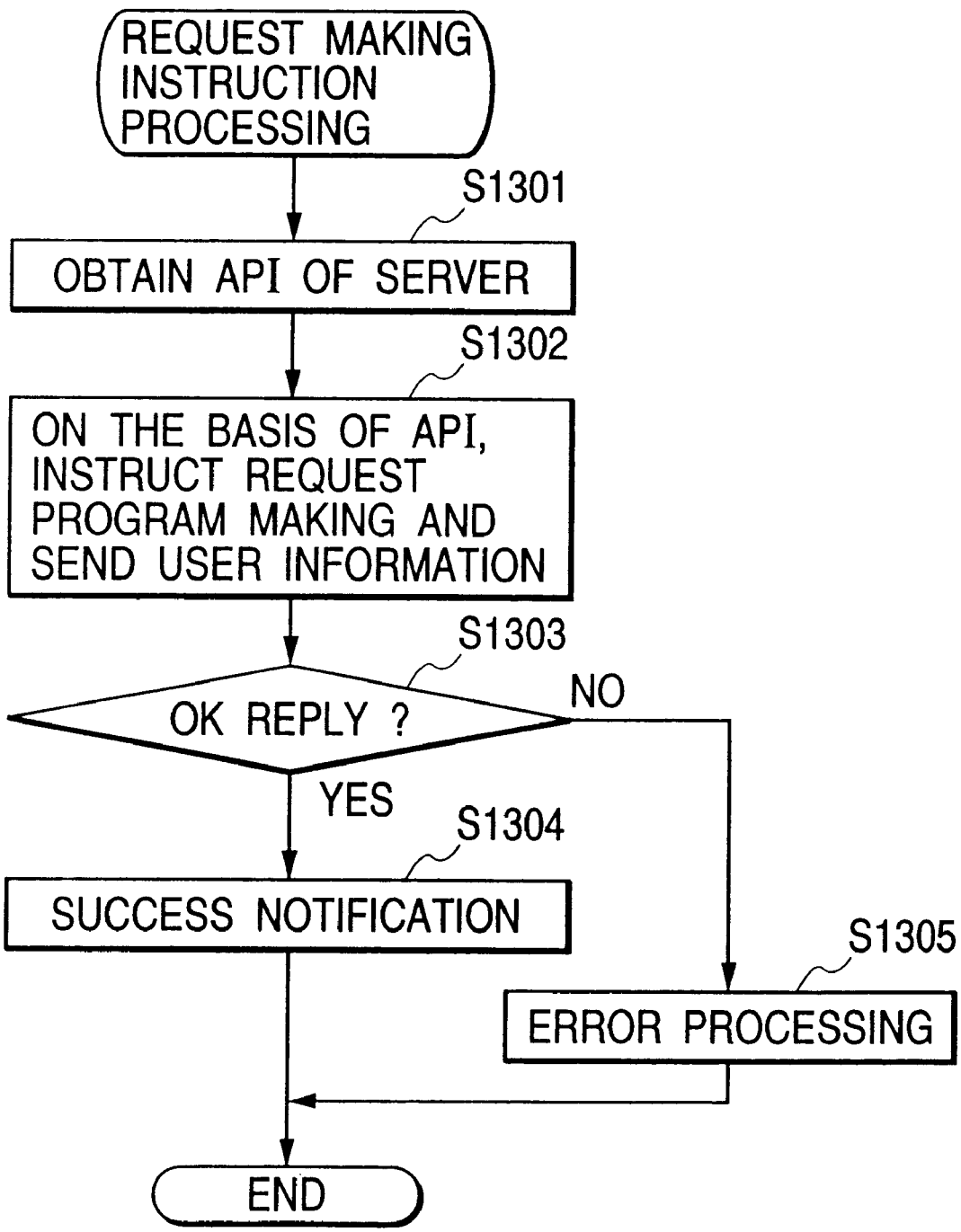
FIG. 11 is a flowchart showing a request making processing procedure executed by the client 201.

FIG. 11 is a flowchart showing a request making instruction processing procedure executed by the client 201. The request making instruction portion 207 executes this processing. The CPU (not shown) executes program codes stored in the memory portion (not shown) in the client 201 to implement the request making instruction portion 207. That is, as in the first embodiment that uses the request making program to make a request, a request making instruction program is used to make a request. To instruct a request to be made using the GUI, a screen similar to that in FIG. 4 can be used.

First, the API of the server is obtained according to the request making instruction program (step S1301). Based on the server API obtained, the request making instruction program displays the screen shown in FIG. 4 to prompt the user to input. After finishing the input, the user depresses the "Request Program Making" button to transmit the contents of the input to the server 101 in order to instruct a request program to be made (step S1302). The transmitted contents are information required to make a request program and information on the requesting user.

Figure 12:
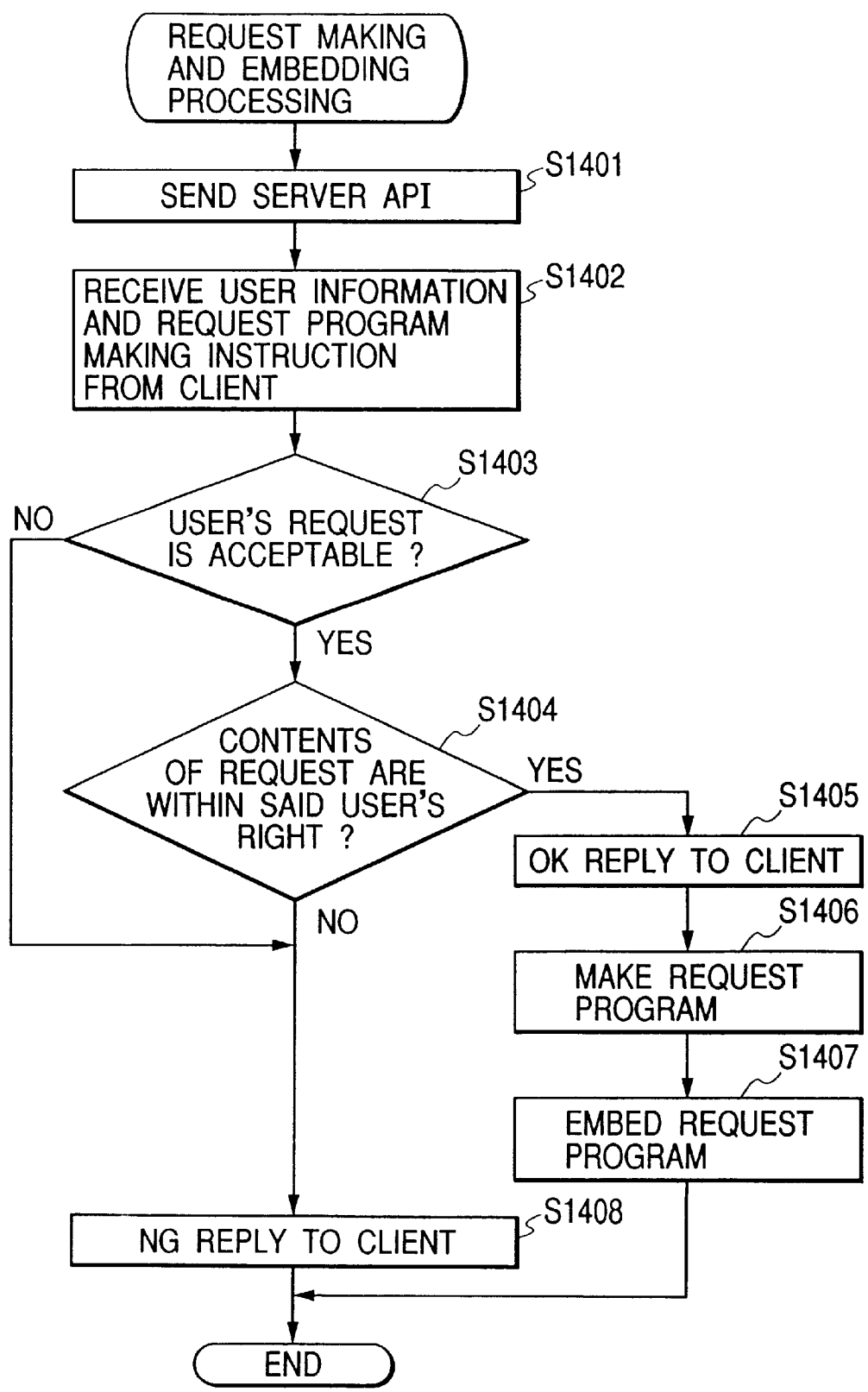
FIG. 12 is a flowchart showing a request making and embedding processing procedure executed by the server 101.

The server 101 executes the subsequent processing for making a request program, using a procedure similar to that in FIG. 3. FIG. 12 is a flowchart showing a request making and embedding processing procedure executed by the server 101. The request making portion 101, the request embedding portion 104, and the request judgement portion 106 execute this processing. The CPU (not shown) executes program codes stored in the memory portion (not shown) in the server 101 to implement the request making portion 101, the request embedding portion 104, and the request judgement portion 106.

First, if the client 201 requests the API from the server 101, the request making portion 110 transmits it (step S1401). As described above, this processing is not always required for this phase.

The request making portion waits for the client 201 to send user information (a user's name and a password) and a request program making instruction (step S1402). The request program making instruction is information required to make a request program. When the request making portion 110 receives the information required to make a request program (step S1402), the request judgement portion 106 references the user database stored in the memory portion 109 in order to check whether this user's password is correct and whether this user is allowed to make a request using a request program (step S1403).

If the result of this check is positive, the request judgement portion checks whether the contents of the request included in this request program making instruction fall within the authority permitted for this user (step S1404).

If the result of this check is also positive, an OK message is returned to the client (step S1405). The request making portion 110 makes a request program (step S1406) and embeds this request program into the service execution processing (step S1407).

The request program is desirably in a form of intermediate or source codes) that enables it to be easily checked prior to actual execution whether the function execution condition is met (whether the program is valid).

On the other hand, if the result of the check in step S1403 or S1404 is negative, an NG message is returned to the client 201 as in FIG. 5 for the first embodiment (step S1408).

According to this embodiment, the server 101 makes a request program to eliminate the need to check the program for validity and syntax.

THIRD EMBODIMENT

Figure 13:
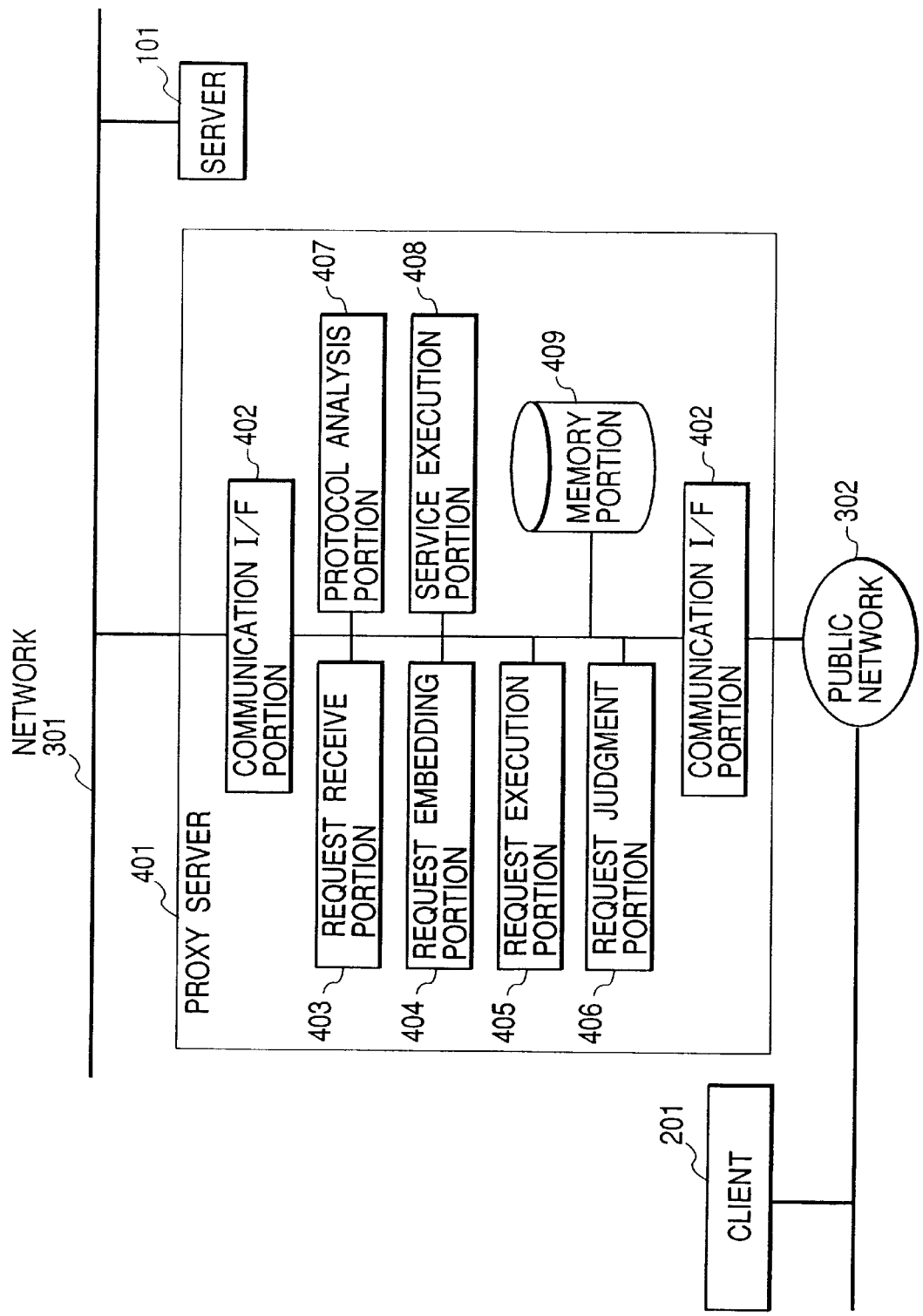
FIG. 13 is a block diagram showing a configuration of a WWW system according to a third embodiment.

A client server system according to a third embodiment is applied to a WWW system. FIG. 13 is a block diagram showing a configuration of a WWW system according to the third embodiment.

This WWW system is composed of the server 101 acting as a Web server, the client 201 including a Web browser, a proxy server 401 installed between the server 101 and the client 201 and connected to them using different communication I/F portions 402, the network 301 connecting the proxy server 401 to the server 101, and a public network 302 connecting the proxy server 401 to the client 201. According to this embodiment, the proxy server 401 functions as a gateway.

The server 101 and the client 201 each have the same configuration as in FIG. 1 except that the services provided by them are mails and WWW. The proxy server 401 has the same configuration as that of the server 101 of FIG. 1 except the points that the proxy server 401 is provided with a plurality of communication interface portions 402 but not provided with any request deleting position.

Thus, the request making, send, receive, embedding, execution, and judgement processing can be carried out between the client 201 and the proxy server 401 in the same manner as in the first embodiment.

The contents of the request can be selected so as to be compatible with the WWW system. FIG. 14 shows in the form of a table, executable request contents that are classified into events, information, and functions.

As seen in table, a request can be executed such that when a Web page is obtained (event), the obtention of the page is rejected (function) if the URL (information) includes a specified string (condition).

Such a request set in the proxy server 401 acts as an effective method for limiting accesses to noxious pages.

It is also contemplated that when a Web page is obtained (event), user authentication is automatically carried out (function) using previously stored user information if the HTTP header includes WWW-Authenticate (condition) (this means that the server 101 requires a user ID and a password for user authentication).

Figure 15:
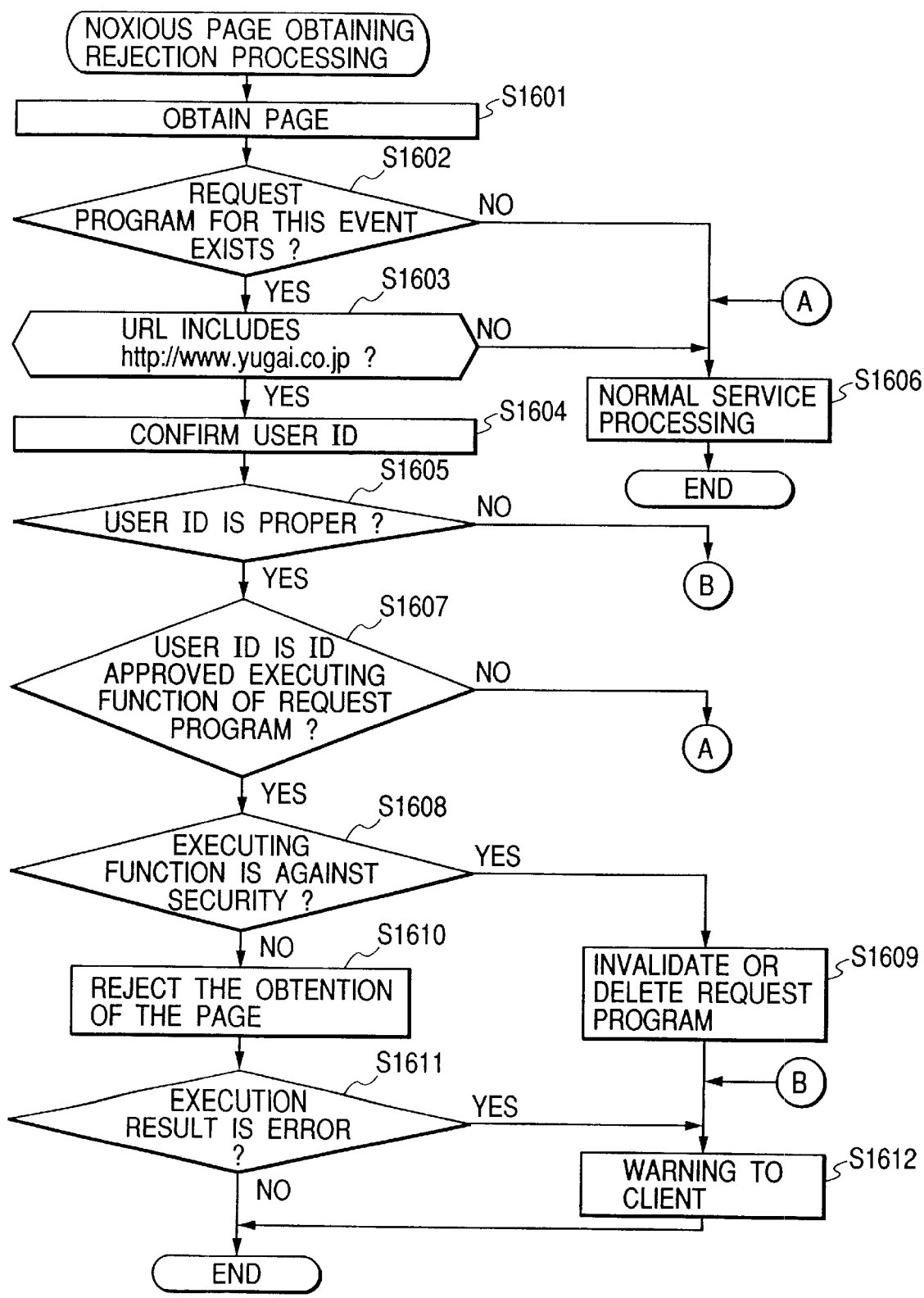
FIG. 15 is a flowchart showing a noxious-page obtention rejection processing procedure as a specific example of request effectuation.

FIG. 15 is a flowchart showing a noxious-page obtention rejection processing procedure as an example of request execution. The request execution portion 405 executes this processing. The CPU (not shown) executes program codes stored in the memory portion (not shown) in the proxy server 401 to implement the request execution portion 405.

To allow this processing to be executed, a request is made such that when the client 201 obtains a Web page (event), the obtention of the page is rejected (function) and is embedded on the proxy server 401 if the URL (information) includes http://www.yugai.co.jp (condition 1) and if the accessing user is not permitted to obtain the page (condition 2).

This procedure is basically the same as in FIGS. 6 and 7 shown in the first embodiment except that user ID check processing is added to the HTTP that does not include user information, in order to reject the obtention of noxious pages.

First, the client 201 uses the Web browser to access the server 101 through the proxy server 401 to obtain a Web page (step S1601). The page obtained is loaded in the proxy server 401 acting as a relay path.

The request execution portion 405 checks whether there is a request program for a page obtention event (step S1602), and if not, executes normal Web service processing (step S1606).

Otherwise, the request execution portion 405 checks request the program function execution condition (step S1603). This example checks whether the URL includes "http://www.yugai.co.jp." If not, the normal Web service processing is executed.

Otherwise, the process shifts to the user ID check processing. In order to send the page data to the user later, they are saved temporarily to the memory portion 409, and the process requests the client 201 to input a user ID and a password. The input user ID and password are used to check the user ID (step S1604). If the users of the client 201 are limited and all the users are permitted to access the page, the inputting of the user ID and password may be eliminated.

The validity of the user ID is checked by checking whether the checked user ID is registered in the user information in the memory portion 409, that is, whether the user ID matches the password (step S1605).

If the user ID is invalid, the normal service processing is not permitted and a warning is provided to the client indicating that the user ID is invalid (step S1612) in order to finish the processing.

On the other hand, if the user ID is valid, it is checked whether the user exists in the user data base listing users permitted to execute the requested program, which data base is stored in the memory means portion (step 1607). In the case that the user does not exist in the list, normal processing is executed: that is, accessible to the page for the user. In the case that the user exists in the data base, which is the case of execution of a request program, processing is executed including a check on the security of the executing function, execution of the function, and determination of the results of the execution (steps S1608 to S1612). That is, if step S1608 finds no security violation, the request execution portion 405 executes the function specified by the request program to reject the obtention of the page (step S1610). Specifically, this page is discarded.

After the function has been executed, the request execution portion 405 checks whether the results of the execution include an error (step S1611). If so, the client 201 is warned about the error (step S1612). Otherwise, the process is successfully finished.

As described above, according to the third embodiment, the request making, send, receive, embedding, execution, and judgement processing is carried out during the Web page service.

This invention is not limited to the mail and WWW systems but is applicable to various client server systems. That is, this invention is applicable to any system in which the server provides part of its information and functionality so that the system can execute a request made based on these information and functionality, that is, other client/server systems such as a news system and an FTP (File Transfer Protocol) system.

Despite the needs for hardware such as the server and client that are connected to the network, this invention can be realized using the program running on each apparatus. Thus, a storage medium on which the program codes of the software implementing the functions of the above embodiments can realize these functions when the CPU reads out these program codes into the RAM for execution. Such storage media supplying program codes include, for example, an optical disc, a photomagnetic disc, a CD-R, an DVD, a magnetic tape, and a non-volatile memory card in addition to a floppy disc, a hard disc, and a CD-ROM.

If this invention is applied to such a storage medium, the program codes corresponding to the flowcharts described above are stored in it. In brief, each of the modules shown in the block diagrams in FIGS. 1, 10, 13 is stored in the storage medium.

What is claimed is:

1. A server, comprising:
   application programming interface (API) information transmitting means for transmitting API information of said server to a client, which produces a program by using the API information of said server, the API information of said server including types of events that occur in said server, types of information that may be provided by said server upon an event occurrence, and types of functions that may be provided by said server upon an event occurrence;
   receiving means for receiving the program from the client, the program being produced in the client according to an instruction of a user of the client by using an API of said server;
   judging means for judging whether the program received by said receiving means is invalid;
   embedding means for embedding the program, which has not been judged to be invalid, into said server as a program executed in said server; and
   executing means for executing the program embedded by said embedding means.

2. The server according to claim 1, wherein before executing the embedded program, said judging means re-judges whether the program is invalid.

3. The server according to claim 1, further comprising:
   deletion instruction receiving means for receiving a deletion instruction for deletion of the program embedded by said embedding means;
   deletion judging means for judging whether the deletion instruction is an invalid request; and
   deletion means for deleting the program embedded in said server based on the deletion instruction, which has not been judged to be an invalid request.

4. The server according to claim 1, further comprising:
   inquiry receiving means for receiving from the client an inquiry about information of the program embedded in said server; and
   sending means for sending the information of the program embedded in said server, in response to the inquiry from the client.

5. The server according to claim 1, wherein said receiving means receives the program and information of the user from the client, and wherein said judging means judges whether the program is invalid by determining whether each function included in the program falls within an authority permitted for the user.

6. A client, comprising:
   application programming interface (API) information receiving means for receiving API information of a server from the server, the API information of the server including types of events that occur in the server, types of information that may be provided by the server upon an event occurrence, and types of functions that may be provided by the server upon an event occurrence;
   program producing means for producing a program based on an instruction of a user of said client and the API information of the server; and
   program transmitting means for transmitting the program produced by said program producing means to the server,
   wherein the server receives the program from the client, judges whether the received program is invalid, embeds the program, which has not been judged to be invalid, into the server as a program executed in the server, and executes the embedded program.

7. The client according to claim 6, further comprising:
   deletion instruction sending means for sending a deletion instruction for deletion of the program embedded in the server.

8. The client according to claim 6, further comprising:
   inquiry sending means for sending an inquiry about information of the program embedded in the server to the server; and
   receiving means for receiving the information of the program embedded in the server from the server.

9. A client server system, comprising a server and a client, wherein said client comprises:
   application programming interface (API) information receiving means for receiving API information of said server from said server, the API information of said server including types of events that occur in said server, types of information that may be provided by said server upon an event occurrence, and types of functions that may be provided by said server upon an event occurrence;

program producing means for producing a program based on an instruction of a user of said client and the API information of said server; and program transmitting means for transmitting the program produced by the program producing means to said server, and wherein said server comprises:

API information transmitting means for transmitting the API information of said server to the API information receiving means;

receiving means for receiving the program transmitted from the program transmitting means;

judging means for judging whether the program received by the receiving means is invalid;

embedding means for embedding the program, which has not been judged to be invalid, into said server as a program executed in said server; and executing means for executing the program embedded by the embedding means.

10. The client server system according to claim 9, wherein before executing the embedded program, the judging means re-judges whether the program is invalid.

11. The client server system according to claim 9, wherein said client further comprises:

deletion instruction sending means for sending a deletion instruction for deletion of the program embedded in said server, and wherein said server further comprises:

deletion instruction receiving means for receiving the deletion instruction for deletion of the program embedded by the embedding means;

deletion judging means for judging whether the deletion instruction is an invalid request; and deletion means for deleting the program embedded in said server based on the deletion instruction, which has not been judged to be an invalid request.

12. The client server system according to claim 9, wherein said client further comprises:

inquiry sending means for sending an inquiry about information of the embedded program to said server; and receiving means for receiving the information of the program embedded in said server from said server, and wherein said server comprises:

inquiry receiving means for receiving from said client the inquiry about the information of the program embedded in said server; and sending means for sending the information of the program embedded in said server, in response to the inquiry from said client.

13. A server controlling method, comprising:

an application programming interface (API) information transmitting step of transmitting API information of the server to a client, which produces a program by using the API information of the server, the API information of the server including types of events that occur in the server, types of information that may be provided by the server upon an event occurrence, and types of functions that may be provided by the server upon an event occurrence;

a receiving step of receiving the program from the client, the program being produced in the client according to an instruction of a user of the client by using an API of the server;

a judging step of judging whether the program received in said receiving step is invalid;

an embedding step of embedding the program, which has not been judged to be invalid, into the server as a program executed in the server; and an executing step of executing the program embedded in said embedding step.

14. The server controlling method according to claim 13, wherein before executing the embedded program, said judging step re-judges whether the program is invalid.

15. The server controlling method according to claim 13, further comprising:

a deletion instruction receiving step of receiving a deletion instruction for deletion of the program embedded in said embedding step;

a deletion judging step of judging whether the deletion instruction is an invalid request; and a deletion step of deleting the program embedded in the server, based on the deletion instruction, which has not been judged to be an invalid request.

16. The server controlling method according to claim 13, further comprising:

an inquiry receiving step of receiving from the client an inquiry about information of the program embedded in the server; and a sending step of sending the information of the program embedded in the server, in response to the inquiry from the client.

17. The server controlling method according to claim 13, wherein said receiving step receives the program and information of the user from the client, and wherein said judging step judges whether the program is invalid by determining whether each function included in the program falls within an authority permitted for the user.

18. A client controlling method, comprising:

an application programming interface (API) information receiving step of receiving API information of a server from the server, the API information of the server including types of events that occur in the server, types of information that may be provided by the server upon an event occurrence, and types of functions that may be provided by the server upon an event occurrence;

a program producing step of producing a program based on an instruction of a user of the client and the API information of the server; and a program transmitting step of transmitting the program produced in said program producing step to the server, wherein the server receives the program from the client, judges whether the received program is invalid, embeds the program, which has not been judged to be invalid, into the server as a program executed in the server, and executes the embedded program.

19. The client controlling method according to claim 18, further comprising:

a deletion instruction sending step of sending a deletion instruction for deletion of the program embedded in the server.

20. A client controlling method according to claim 18, further comprising:

an inquiry sending step of sending an inquiry about information of the program embedded in the server to the server; and a receiving step of receiving the information of the program embedded in the server from the server.

21. A client server system controlling method for controlling a client server system comprising a server and a client, said method comprising:

at the client:
   an application programming interface (API) information receiving step of receiving API information of the server from the server, the API information of the server including types events that occur in the server, types of information that may be provided by the server upon an event occurrence, and types of functions that may be provided by the server upon an event occurrence;
   a program producing step of producing a program based on an instruction of a user of the client and the API information of the server; and
   a program transmitting step of transmitting the program produced in said program producing step to the server, and
in the server:
   an API information transmitting step of transmitting the API information of the server to be received in said API information receiving step;
   a receiving step of receiving the program transmitted in said program transmitting step;
   a judging step of judging whether the received program is invalid;
   an embedding step of embedding the program, which has not been judged to be invalid, into the server as a program executed in the server; and
   an executing step of executing the program embedded in said embedding step.

22. The client server system controlling method according to claim 21, wherein before executing the embedded program, said judging step re-judges whether the program is invalid.

23. The client server system controlling method according to claim 21, further comprising:
at the client:
   a deletion instruction sending step of sending a deletion instruction for deletion of the program embedded in the server, and
at the server:
   a deletion instruction receiving step of receiving the deletion instruction for deletion of the program embedded in said embedding step;
   a deletion judging step of judging whether the deletion instruction is an invalid request; and
   a deletion step of deleting the program embedded in the server, based on the deletion instruction, which has not been judged to be an invalid request.

24. The client server system controlling method according to claim 21, further comprising:
at the client:
   an inquiry sending step of sending an inquiry about information of the embedded program to the server; and
   a receiving step of receiving the information of the program embedded in the server from the server, and
at the server:
   an inquiry receiving step of receiving from the client the inquiry about the information of the program embedded in the server; and
   a sending step of sending the information of the program embedded in the server, in response to the inquiry from the client.

25. A storage medium storing a computer-readable server controlling program, the program comprising:
   code for an application programming interface (API) information transmitting step of transmitting API information of a server to a client, which produces a program by using the API information of the server, the API information of the server including types of events that occur in the server, types of information that may be provided by the server upon an event occurrence, and types of functions that may be provided by the server upon an event occurrence;
   code for a receiving step of receiving the program from the client, the program being produced in the client according to an instruction of a user of the client by using an API of the server;
   code for a judging step of judging whether the program received in the receiving step is invalid;
   code for an embedding step of embedding the program, which has not been judged to be invalid, into the server as a program executed in the server; and
   code for an executing step of allowing the server to execute the program embedded in the embedding step.

26. The storage medium according to claim 25, wherein before executing the embedded program, the judging step re-judges whether the program is invalid.

27. The storage medium according to claim 25, wherein the program further comprises:
   code for a deletion instruction receiving step of receiving a deletion instruction for deletion of the program embedded into the server in the embedding step;
   code for a deletion judging step of judging whether the deletion instruction is an invalid request; and
   code for a deletion step of deleting the program embedded in the server, based on the deletion instruction, which has not been judged to be an invalid request.

28. The storage medium according to claim 25, wherein the program further comprises:
   code for an inquiry receiving step of receiving from the client an inquiry about information of the program embedded in the server; and
   code for a sending step of sending the information of the program embedded in the server, in response to the inquiry from the client.

29. The storage medium according to claim 25, wherein the receiving step receives the program and information of the user from the client, and wherein the judging step judges whether the program is invalid by determining whether each function included in the program falls within an authority permitted for the user.

30. A storage medium storing a computer-readable client controlling program, the program comprising:
   code for an application programming interface (API) information receiving step of receiving API information of a server from the server, the API information of the server including types of events that occur in the server, types of information that may be provided by the server upon an event occurrence, and types of functions that may be provided by the server upon an event occurrence;
   code for a program producing step of producing a program based on an instruction of a user of the client and the API information of the server; and
   code for a program transmitting step of transmitting the program produced in the program producing step to the server,
   wherein the server receives the program from the client, judges whether the received program is invalid, embeds the program, which has not been judged to be invalid, into the server as a program executed in the server, and executes the embedded program.

31. The storage medium according to claim 30, wherein the program further comprises:
  code for a deletion instruction sending step of sending a deletion instruction for deletion of the program embedded in the server.

32. The storage medium according to claim 30, wherein the program further comprises:
  code for an inquiry sending step of sending an inquiry about information of the program embedded in the server; and
  code for a receiving step of receiving the information of the program embedded in the server from the server.

33. A storage medium storing a computer-readable client server system controlling program for controlling a client server system comprising a server and a client, the program comprising:
  code for, occurring at the client:
    an application programming interface (API) information receiving step of receiving API information of the server from the server, the API information of the server including types of events that occur in the server, types of information that may be provided by the server upon an event occurrence, and types of functions that may be provided by the server upon an event occurrence;
    a program producing step of producing a program based on an instruction of a user of the client and the API information of the server; and
    a program transmitting step of transmitting the program produced in the program producing step to the server, and
  code for, occurring at the server:
    an API information transmitting step of transmitting the API information of the server to be received in the API information receiving step;
    a receiving step of receiving the program transmitted in the program transmitting step;
    a judging step of judging whether the program received in said receiving step is invalid;
    an embedding step of embedding the program, which has not been judged to be invalid, into the server as a program executed in the server; and
    an executing step of allowing the server to execute the program embedded in the embedding step.

34. The storage medium according to claim 33, wherein before executing the embedded program, the judging step re-judges whether the program is invalid.

35. The storage medium according to claim 33, wherein the program further comprises code for:
  occurring at the client:
    a deletion instruction sending step of sending a deletion instruction for deletion of the program embedded in the server; and
  occurring at the server:
    a deletion instruction receiving step of receiving the deletion instruction for deletion of the program embedded in the embedding step;
    a deletion judging step of judging whether the deletion instruction is an invalid request; and
    a deletion step of deleting the program embedded in the server, based on the deletion instruction, which has not been judged to be an invalid request.

36. The storage medium according to claim 33, wherein the program further comprises code for:
  occurring at the client:
    an inquiry sending step of sending an inquiry about information of the embedded program to the server; and
    a receiving step of receiving the information of the program embedded in the server from the server; and
  occurring at the server:
    an inquiry receiving step of receiving from the client the inquiry about the program embedded in the server; and
    a sending step of sending the information of the program embedded in the server to the server, in response to the inquiry from the client.

37. A computer-implemented server controlling program, comprising:
  code for an application programming interface (API) information transmitting step for transmitting API information of a server to a client, which produces a program by using the API information of the server, the API information of the server including types of events that occur in the server, types of information that may be provided by the server upon an event occurrence, and types of functions that may be provided by the server upon an event occurrence;
  code for a receiving step of receiving the program from the client, the program being produced in the client according to an instruction of a user of the client by using an API of the server;
  code for a judging step of judging whether the program receiving in the receiving step is invalid;
  code for an embedding step of embedding the program, which has not been judged to be invalid, into the server as a program executed in the server; and
  code for an executing step of executing the program embedded in the embedding step.

38. A computer-implemented client controlling program, comprising:
  code for an application programming interface (API) information receiving step of receiving API information of application programming interface of a server from the server, the API information of the server including types of events that occur in the server, types of information that maybe provided by the server upon an event occurrence, and types of functions that may be provided by the server upon an event occurrence;
  code for a program producing step of producing a program based on an instruction of a user of the client and the API information of the server; and
  code for a program transmitting step of transmitting the program produced in the program producing step to the server,
  wherein the server receives the program from the client, judges whether the received program is invalid, embeds the program, which has not been judged to be invalid, into the server as a program executed in the server, and executes the embedded program.

* * * * *

UNITED STATES PATENT AND TRADEMARK OFFICE
CERTIFICATE OF CORRECTION

PATENT NO.    : 6,529,943 B1
DATED         : March 4, 2003
INVENTOR(S)   : Hirokazu Ohi It is certified that error appears in the above-identified patent and that said Letters Patent is hereby corrected as shown below:

Column 3,
Line 24, "Whether" should read -- whether --.

Column 6,
Lines 52-53, "o f" should read -- of --.

Column 11,
Line 47, "(step S1705):," should read -- (step S1705), --.

Column 13,
Line 32, "codes)" should read -- codes --.

Column 17,
Line 25, Close up right margin.

Column 19,
Line 5, "types" should read -- types of --.

Column 22,
Line 34, "receiving in" should read -- received in --.
Line 47, "maybe" should read -- may be --.

Signed and Sealed this

Seventh Day of October, 2003

JAMES E. ROGAN
*Director of the United States Patent and Trademark Office*